United States Patent
Rahmilov et al.

(10) Patent No.: US 12,160,181 B2
(45) Date of Patent: Dec. 3, 2024

(54) POWER CONVERTER

(71) Applicant: Solaredge Technologies Ltd., Herzeliya (IL)

(72) Inventors: Alfred Rahmilov, Rosh Haayin (IL); Ohad Fried, Ra'anana (IL); Tzachi Glovinsky, Petah Tikva (IL); Ilan Yoscovich, Givatayim (IL); Lior Sarig, Herzliya (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 18/151,651

(22) Filed: Jan. 9, 2023

(65) Prior Publication Data

US 2023/0223868 A1 Jul. 13, 2023

Related U.S. Application Data

(60) Provisional application No. 63/298,761, filed on Jan. 12, 2022.

(51) Int. Cl.
 *H02M 7/5387* (2007.01)
 *H02M 7/487* (2007.01)

(52) U.S. Cl.
 CPC ....... *H02M 7/53871* (2013.01); *H02M 7/487* (2013.01)

(58) Field of Classification Search
 CPC .................... H02M 7/53871; H02M 7/487
 See application file for complete search history.

(56) References Cited

FOREIGN PATENT DOCUMENTS

| CN | 111030499 A | 4/2020 |
|---|---|---|
| WO | 2020238824 A1 | 12/2020 |

OTHER PUBLICATIONS

Serban et al. "IEEE Flexible AC Phase Configurable NPC-based Converter Topology",2021 IEEE Energy Conversion Congress and Exposition, Oct. 10, 2021 (Year: 2021).*
Emanuel Serban et al., "Flexible AC Phase Configurable NPC-based Converter Topology," 2021 IEEE Energy Conversion Congress and Exposition, Oct. 10, 2021.
Ye Mei et al., "Highly efficient and reliable inverter concept-based transformerless photovoltaic inverters with tri- direction clamping cell for leakage current elimination," IET Power Electronics, vol. 9, No. 8, Jun. 29, 2016.
G. Vazquez et al., "A Modulation Strategy for a Single-Phase Transformerless Multilevel Inverter with Dual Bidirectional Switch," 2018 AEIT International Annual Conference, Oct. 3, 2018.
Jun. 9, 2023—European Extended Search Report—EP App. No. 23151389.6.

* cited by examiner

*Primary Examiner* — Jue Zhang
(74) *Attorney, Agent, or Firm* — Banner & Witcoff, Ltd.

(57) ABSTRACT

A single-phase power converter is disclosed for converting a direct current power source to an alternating current power across first and second output terminals, which may be connected to a split-phase system having a first-phase load connected between one phase and a second-phase load connected between the other phase. When the loads are not balanced, the single-phase power converter provides a differential current to compensate for the imbalance.

20 Claims, 21 Drawing Sheets

POWER CONVERTER

CROSS-REFERENCE TO RELATED APPLICATIONS

This application claims the benefit of U.S. Provisional Application No. 63/298,761, filed on Jan. 12, 2022. The entire disclosure of the foregoing application is incorporated by reference in its entirety.

BACKGROUND

A converter (or power converter) is a power electronic device that is capable of providing alternating current (AC) power at a desired AC voltage level at its output. The desired AC voltage output is output by conversion of one or more direct current (DC) voltage levels at the converter input. Some single-phase converters can operate in a split-phase mode of operation or be coupled to a split-phase electric power distribution system. A single-phase converter that is coupled to a split-phase electric power distribution system, may be connected at its output to three-wire neutral midpoint power distribution system. A phase imbalance between the split phases may be caused by various factors, such as an unstable utility supply, an unbalanced transformer bank, unevenly distributed single-phase loads on the same power system, an unidentified single-phase-to-ground fault, etc. A single-phase converter operating in a split-phase mode or coupled to a split-phase electric power distribution system (e.g., grid) traditionally cannot operate with a phase imbalance that could cause current to flow through the neutral line, and which could result in current and/or voltage surges (e.g., that may result to converter tripping and/or shutdown), overheating of components of the converter (e.g., that may result to a malfunctioning or even explosion of the component), excessive power loss, decreased voltage profile, and cause malfunction in the load or the electric power distribution system.

SUMMARY

The following summary presents a simplified summary of certain features. The summary is not an extensive overview and is not intended to identify key or critical elements.

A power system may include interconnection of various groups of power sources. Each group of power sources may generate different types of power derived from renewable energy sources and non-renewable energy sources. The renewable energy sources may include photovoltaic (PV), wind or wave power. Examples of non-renewable energy sources may include oil, natural gas, coal, and nuclear fuel.

A power system may supply power to a load and/or a storage device. The power system may include various interconnections of groups of direct current (DC) power sources, which may be connected in various series, parallel, series-parallel and parallel-series combinations. Some power systems may include the connection of DC power sources to a power converter circuit to generate alternating current (AC) power. The power converter circuit may have a single-phase converter topology that converts DC voltage at a pair of input terminals to a predetermined AC voltage level at a pair of output terminals. The output terminals may be connected across a split-phase output in which a first load is connected between a first output terminal of the converter and an intermediate point (e.g., the neutral point), and a second load is connected between the second output terminal of the converter and the intermediate point.

The power converter circuit may include a controller configured to compensate for an imbalance of loads connected to each phase of the split-phase output by controlling a current path to the intermediate point (e.g., neutral point) of the split-phase output to conduct an imbalance current.

The single-phase converter may be transformerless. For example, the power converter circuit may comprise one or more switches that provide a DC current path from the input terminals to the output terminals (e.g., where the input is not isolated from the output by a transformer). For example, the power converter circuit may include a first circuit that includes a first capacitor and a second capacitor. The first circuit may be connected across the pair of input terminals. A connection of the first capacitor to the second capacitor may be at an intermediate terminal (e.g., a neutral point). The intermediate terminal of the split-phase output and the intermediate terminal in the first circuit may be connected together. A second circuit may include a first switch and a second switch connected end to end at a second terminal. A third circuit may include a third switch and a fourth switch connected at a third terminal. The second and third circuits may be connected across the pair of input terminals, and the second and third terminals may be connected to the output terminals through one or more inductors.

The controller may be configured to control (e.g., by pulse width modulated (PWM) signals) the first and second switches of the second circuit and the third and fourth switches of the third circuit. The controller may be operable to convert, using the second and third circuits, a DC input voltage connected to the pair of input terminals to an AC output voltage across the split-phase output. The converter may comprise a plurality of other circuits comprising one or more switches connected to the second and the third terminals. The controller may compensate for an imbalance of loads connected to each phase of the split-phase output using the plurality of other circuits connected across the second and third terminals to create a current path to the loads through the intermediate terminal (e.g., neutral terminal).

The controller may measure/sense the current flowing to the loads to detect an imbalance or balance of loads connected to each phase of the split-phase output. Based on the detected imbalance or balance, the controller may control, by changing the PWM signals, switches (e.g., MOSFETs/IGBTs) to balance the currents flowing through the inductors/outputs. The controller may change the modulation of the PWM signals, based on determining an imbalance and/or a balance of the loads.

The controller may change the modulation of the PWM signals, based on determining a higher efficient modulation scheme. For example, based on determining a low power consumption, the controller may temporarily turn off one or more of the switches to reduce switching losses.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
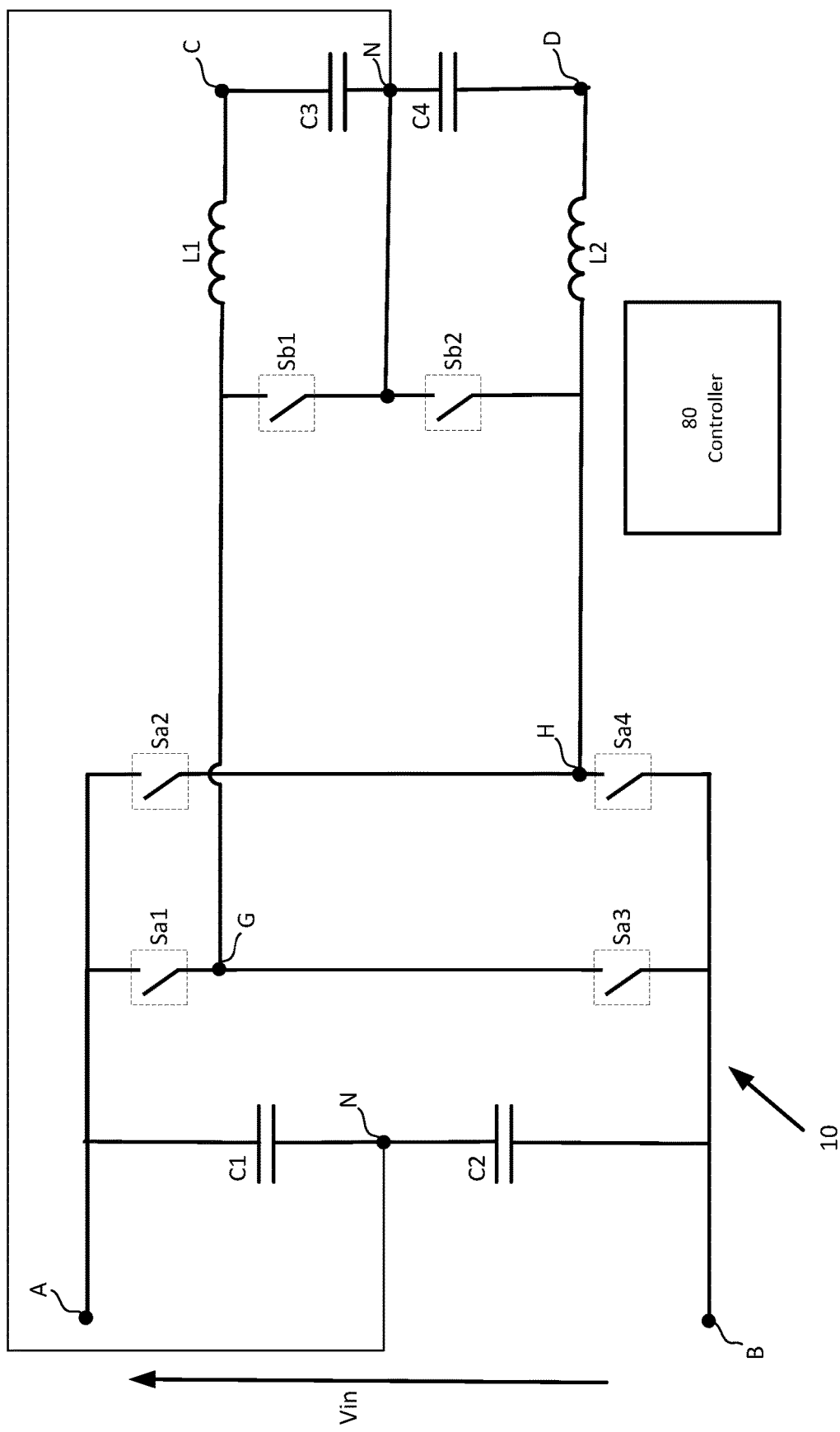
FIGS. 1-3, 4a-4b, 5a-5b illustrate diagrams of example electrical circuits.

In the following description of various aspects of the disclosure, reference is made to the accompanying drawings, which form a part hereof, and in which are shown, by way of illustration, various embodiments in which aspects of the disclosure may be practiced. Other embodiments may be utilized and structural and functional modifications may be made, without departing from the scope of the present disclosure.

Features disclosed herein may relate to a converter (e.g., a power converter circuit, also identified as a power converter) that addresses the problems with imbalanced phases. The converter may be capable of providing alternating current (AC) power at a predetermined AC voltage level at its output from direct current (DC) power at a specific DC voltage applied at its input. The power converter circuit may comprise a single-phase converter circuit topology (e.g., a transformerless single-phase converter circuit topology). The desired AC voltage level is generated by conversion of DC voltage levels via an intermediate point included in the single-phase converter circuit topology. The power converter circuit may be configured to conduct a first current to a first-phase load from a first capacitor (e.g., coupled between a first output terminal and a neutral terminal) and a second current to a second-phase load from a second capacitor (e.g., coupled between a second output terminal and a neutral terminal). The power converter circuit may be configured to conduct a difference (e.g., differential current) between the first and the second current through a switched path in the single-phase inverter via the neutral terminal.

Some features disclosed herein may relate to the use of the power converter circuit as a (e.g., synchronous and/or non-synchronous) rectifier. In this case, the power converter circuit is capable of providing a direct current (DC) voltage at its output from a predetermined alternating current (AC) voltage level applied at its output.

The term "pulse width modulation" or "PWM" is used herein with respect to the operation of switches described below. Unless otherwise stated, "PWM" with respect to operation of a switch includes alternating between opening (controlled to be non-conducting or "OFF" state) and closing (controlled to be conducting or "ON" state) the switch repeatedly (e.g., periodically at a switching frequency) for a time period, wherein the duration the switch is on and the duration the switch is off (or the ratio between the ON duration to the OFF duration) is varied to control the average level of current, voltage, or power that is transferred through the switch over time (e.g., to generate a waveform after filtering). PWM is further used to broadly refer to other switch modulation techniques that control the average current, voltage, or power that is transferred through the switch. Such other modulation techniques include, but are not limited to, sinusoidal pulse width modulation, modified pulse width modulation, space vector modulation, delta modulation, specific harmonic modulation, selective harmonic elimination, and wavelet modulation.

The terms "multiple and "plurality" as used here mean two or more, and a thing referred to in the plural (e.g., switches), is equivalent to a "multiple" or a "plurality" of that thing (e.g., "multiple switches, "plurality of switches).

The terms "comprise" and "comprises" and "comprising," "include" and "includes" and "including," and "have" and "has" and "having" are used synonymously herein (including the claims).

The terms "substantially" and "about", as used herein, indicate variations that are equivalent for an intended purpose or function (e.g., within a permissible variation range). A specific value preceded by (or used in conjunction with) the term "substantially" or "about" refers to a range of values that include the specific value, and other values that in the context in which the specific value is presented, are equivalent to the specific value (e.g., values that differ by round-off errors, measurement errors, precision limitations, the inclusion of noise or other spurious signals, transient changes in the value, and other differences that do not affect the application in which the value is used).

The term "switch", as used herein, may refer (though is not limited) to a metal oxide semiconductor field effect transistors (MOSFET), an insulated-gate bipolar transistor (IGBT), Gallium nitride transistor (GaN), bipolar junction transistors (BJTs), field effect transistors (FETs), silicone-controlled rectifiers (SCRs) or any known solid-state switch, or any combination of these components.

All values are examples, and are not meant to be limiting. Also, all specified values in the specification and figures include values that are substantially equal to the given values. For example, a specified value of 120V in a United States power grid system would include any voltage that would be a permissible substitute for 120V in that system (e.g., 118V, 122V, etc.).

FIG. 1 illustrates a diagram of an example power converter circuit 10 with a single-phase converter (e.g., inverter) circuit topology (e.g., a single-phase transformerless converter). Power converter circuit 10 may be coupled to a split-phase (off-grid) load or split-phase electric power distribution system (e.g., grid, distribution board in the home coupled to a grid). Being coupled to a split-phase (off-grid) load, power converter circuit 10 may regulate the output voltage across the loads. Whereas, being coupled to split-phase electric power distribution system, power converter circuit 10 may sync to a voltage regulated by the grid. A direct current (DC) input voltage Vin may be applied across a first input terminal (A) and a second input terminal (B). Input voltage Vin may be a DC voltage received from one or more DC power sources, e.g. a battery, a photovoltaic panel, a rectified source of alternating current (AC) from an AC generator, etc. A first circuit in power converter circuit 10 may be coupled between input terminals (A) and (B). The first circuit may comprise a first capacitor (C1) coupled between input terminal (A) and a first terminal (N), and a second capacitor (C2) coupled between input terminal (B) and the first terminal (N). First terminal (N) may provide a voltage reference, for example, by being be coupled to at least one of a neutral potential, an earth potential, or a reference terminal, and may be the neutral point of the split-phase output. First Terminal (N) is illustrated at two locations (one near the input and one near the output) which are connected together. While the two locations of first terminal (N) are illustrated with a direct connection, the connection between the two location s may be via one or more intermediate connections, such as earth ground, a frame conductor, etc. Each of the first capacitor (C1) and the second capacitor (C2) may comprise one or more capacitors connected in parallel, connected in series or arranged as a combination of parallel and series connections.

A second circuit in power converter circuit 10 may be coupled between input terminals (A) and (B). The second circuit may comprise a first switch (Sa1) coupled between input terminal (A) and a second terminal (G), and a second switch (Sa3) coupled between input terminal (B) and the second terminal (G).

A third circuit in power converter circuit 10 may be coupled between input terminals (A) and (B). The third circuit may comprise a third switch (Sa2) coupled between input terminal (A) and a third terminal (H), and a fourth switch (Sa4) coupled between input terminal (B) and the third terminal (H).

The power converter circuit 10 may further include a first inductor (L1) coupled between the second terminal (G) and a first output terminal (C), and a second inductor (L2) coupled between the third terminal (H) and a second output terminal (D). In some examples, power converter circuit 10 may include only one of the first inductor (L1) and the second inductor (L2). Power converter circuit 10 may be configured to convert DC input power (with DC input voltage Vin) across the input terminals (A) and (B) into an AC output power with an AC voltage across the first output terminal (C) and the second output terminal (D). As further discussed below, one or more of the switches in power converter circuit 10 will be pulse width modulated (PWM). During a pulse duration of the duty cycle, the first inductor (L1) and/or the second inductor (L2) are being charged, and during a complementary period of the pulse duration of the duty cycle (e.g., free-wheeling period), the first inductor (L1) and/or the second inductor (L2) are being discharged.

In some variations, a fourth circuit in power converter circuit 10 may additionally be included and coupled across the first output terminal (C) and the second output terminal (D). The fourth circuit may include a third capacitor (C3) and a fourth capacitor (C4). The third capacitor (C3) may be coupled between the first output terminal (C) and the first terminal (N). The fourth capacitor (C4) may be coupled between the second output terminal (D) and the first terminal (N). As illustrated, first terminal (N) includes an intermediate point at the input between the first capacitor (C1) and the second capacitor (C2), and is an intermediate point at the output between the third capacitor (C3) and the fourth capacitor (C4) (as already described, the intermediate points may be physically separated, but electrically connected).

The first output terminal (C), the second output terminal (D), and the first terminal (N) may form an interface to a split-phase (off-grid) load or electric power distribution system (e.g., grid, distribution board connected to a grid) in which an AC voltage is generated between the first output terminal (C) and the second output terminal (D). First terminal (N) may be a neutral point of the split-phase output such that the AC voltage across terminals (C) and (D) results in a first phase AC output with first phase AC voltage and first phase AC current between terminal (C) and (N), and a second phase AC output with a second phase AC voltage and second phase AC current between the terminals (D) and (N). Under balanced conditions, the first and second phase AC voltages may have half the amplitude of the AC voltage across terminals (C) and (D) and are 180 degrees phase shifted from one another. Under balanced conditions, the first phase current from (C) to (N) may be equal and 180 degrees phase shifted from the second phase current from (D) to (N).

In a split-phase system, different loads may be coupled across terminals (C) and (N) and across (D) and (N) respectively. For example, a first-phase load(s), comprising one or more loads (e.g., a first plurality of loads), may be coupled across terminals (C) and (N), and may comprise various components/elements (e.g., inductance, resistance, capacitance). Second-phase load(s), comprising one or more loads (e.g., a second plurality of loads), may be coupled across terminals (D) and (N), and may comprise various other components/elements (e.g., inductance, resistance, capacitance). In referring to the first-phase load(s) and second-phase load(s) below, the first-phase load(s) or the second-phase load(s) may include no load, while the other phase has at least one load, which is one example of an imbalance between the phases. In some examples, third capacitor (C3) and fourth capacitor (C4) may represent an equivalent or a total capacitance of the first-phase load(s) across terminals (C) and (N) and the second-phase load(s) across (D) and (N), respectively. Power converter circuit 10 may be configured to provide power (e.g., first and second phase AC power, respectively) to the first-phase loads and the second-phase load(s) based on the load characteristics. For example, power converter circuit 10 may provide a first current to the first-phase load(s) connected across terminals (C) and (N) and a second current of different magnitude and/or phase across the second-phase load(s) connected across terminals (D) and (N), based on a determined criterion (e.g., respective load impedances). In another example, power converter circuit 10 may provide a first voltage to the first-phase load(s) and a second voltage of different magnitude and/or phase to the second-phase load(s), based on a determined criterion. Criterion applied for determining the currents may be different than criterion applied for determining voltages.

A fifth circuit in power converter circuit 10 may be coupled across the second terminal (G) and the third terminal (H). The fifth circuit may comprise a fifth switch (Sb1) and a sixth switch (Sb2). The fifth switch (Sb1) may be coupled between the second terminal (G) and the first terminal (N), and the sixth switch (Sb2) may be coupled between the third terminal (H) and the first terminal (N).

Power converter circuit 10 may additionally comprise or be connected to a controller 80, (e.g., a digital signal processing (DSP) circuit, a field programmable gate array (FPGA) device, an embedded controller, etc.). Controller 80 may be configured to control power converter circuit 10 and its components (for example, switches Sa1, Sa2, Sa3, Sa4, Sb1, Sb2.) based on a predetermined algorithm, a measured parameter (e.g., a measurement collected by one or more sensors), a calculated parameter, an estimated parameter (e.g., based on one or more measured parameters), a determined parameter (e.g., based on a combination of algorithm, measure parameter, calculated parameter, and/or estimated parameter) or any other appropriate data. As an example, such parameters may include an electrical parameter, including: current, voltage, power, frequency, etc. at any of the above described terminals. In some aspects, controller 80 may comprise or be coupled to sensors configured to measure or sense one or more electrical parameters of power converter circuit 10. Based on the measurement or the sensing of the one or more electrical parameters of power converter circuit 10, controller 80 may determine load characteristics of the first-phase load(s) (e.g., connected between terminals (C) and (N)) and/or the second-phase load(s) (e.g., connected between terminals (D) and (N)), and/or phase imbalance (or balance) of current through or voltage across the first-phase load(s) and the second-phase load(s). Phase imbalance may occur when the power converter circuit 10 (via the first output terminal (C), the second output terminal (D), and the first terminal (N)) forms an interface to a split-phase (off-grid) load or electric power distribution system (e.g., grid, distribution board connected to a grid) in which an AC voltage is generated between the first output terminal (C) and the second output terminal (D).

Controller 80 may be configured to control (turn on and off) one or more switches, including: the first switch (Sa1), the second switch (Sa3), the third switch (Sa2), the fourth switch (Sa4), the fifth switch (Sb1) and the sixth switch (Sb2). Controller 80 may control the one or more switches based on a reference signal (e.g., digital, analog) that comprises a sine wave. A frequency of the sine wave may correspond (e.g., be equal to) to an output frequency of AC power output by power converter circuit 10.

Additionally or alternatively, controller 80 may use another (e.g., second) reference signal (e.g., a clock signal) to switch the one or more switches, at a switching frequency, based on a duty cycle ratio. The switching frequency may be higher than the sine wave frequency of the reference signal (e.g., 1 kHz to greater than 100 MHz, such as 16 kHz, 25 kHz, 50 kHz, 100 kHz, 1 MHz, 100 MHz, a variable frequency of 16 kHz-100 MHz etc.). The duty cycle ratio may be an absolute value of an instantaneous value of the reference signal (or the reference signal multiplied by a scaling factor) divided by a peak amplitude of the sine wave. For example, in a standard North American power transmission grid, the nominal voltage supplied to the consumer may be 120V RMS. Thus, the peak amplitude of the sine wave may be $120 \times \sqrt{2} = 169.7V$. In this example, if the instantaneous value of the reference is 84.85 V, the duty cycle ratio may be $D_{duty\text{-}cycle} = |84.85/120 \times \sqrt{2}| \approx 0.5$. Alternatively, if the instantaneous value of the reference (is $-118.8$ V, the duty cycle ratio may be $D_{duty\text{-}cycle} = |-118.8/120 \times \sqrt{2}| \approx 0.7$. Thus, the duty cycle ratio may change throughout each cycle of the sine wave period. For each duty cycle ratio calculated during the cycle, one or more switches of circuit (10) may be switched based on the duty cycle ratio, by being turned on for the duration calculated as duty cycle ratio multiplied by the cycle time of the switching frequency and turned off for a remaining duration (cycle time–ON duration) of the cycle time. In some examples, other switches of circuit (10) may be turned off for a duration (e.g., to reduce switching losses, one of the first-phase load(s) or the second-phase loads(s) includes no load).

In some examples, one or more switches of: the first switch (Sa1), the second switch (Sa3), the third switch (Sa2), the fourth switch (Sa4), the fifth switch (Sb1) and the sixth switch (Sb2), may be controlled by another component (e.g., another controller, passive components).

In some examples, controller 80 may control the first switch (Sa1), in correspondence with (e.g., at the same time and state as) the fourth switch (Sa4), at a switching frequency based on a duty cycle ratio during positive a half of the reference signal. During a negative half of the reference signal, controller 80 may control the first switch (Sa1) and the fourth switch (Sa4) to be OFF. Controller 80 controls the second switch (Sa3), in correspondence with (e.g., at the same time and state as) the third switch (Sa2), at the switching frequency based on the duty cycle ratio during the negative half of the reference signal, and to be OFF during the positive half of the reference signal.

Which of the one or more switches in circuit (10) are switched based on the duty cycle ratio may be based on whether the reference signal is positive or negative (e.g., during positive and negative halves of a sine wave). During the positive half of the reference signal, controller 80 may control the fifth switch (Sb1) and the sixth switch (Sb2) substantially (e.g., neglecting dead time, rise and fall time, etc.) in a complementary manner with respect to the first switch (Sa1) and the fourth switch (Sa4). During the negative half of the reference signal, controller 80 may control the fifth switch (Sb1) and the sixth switch (Sb2) substantially (e.g., neglecting dead time, rise and fall time, etc.) in a complementary manner with respect to the second switch (Sa3) and the third switch (Sa2).

In some examples, phase imbalance between the first-phase load(s) (e.g., connected between terminals (C) and (N)) and the second-phase load(s) (e.g., connected between terminals (D) and (N)) may occur when one of the load(s) is drawing more power than the other load(s). In such a case, the topology of power converter circuit 10 with the control scheme (implemented by controller 80) may control the differential current (the difference between the current drawn by the first-phase load(s) and the current drawn by the second-phase load(s)) to flow through the first terminal (N).

In other example, phase imbalance between the first-phase load(s) (e.g., connected between terminals (C) and (N)) and the second-phase load(s) (e.g., connected between terminals (D) and (N)) may occur when one of the load(s) is more reactive than the other load(s). In such a case, the topology of power converter circuit 10 with the control scheme (implemented by controller 80) may control the current drawn by the first-phase load(s) to be in phase with the current drawn by the second-phase load(s)).

In other example, phase imbalance between the first-phase load(s) (e.g., connected between terminals (C) and (N)) and the second-phase load(s) (e.g., connected between terminals (D) and (N)) may occur when one of the load(s) is generating a higher voltage than the other load(s). In such a case, the topology of power converter circuit 10 with the control scheme (implemented by controller 80) may control the voltage provided to the first-phase load(s) to be higher than the voltage provided to the second-phase load(s)) to flow through the first terminal (N) (for example, while keeping the AC voltage across (C) and (D) at a predetermined or constant level).

In some examples, based on controller 80 detecting/determining a phase imbalance between the first-phase load(s) and the second-phase load(s), the controller may adjust the modulation scheme of one or more of the PWM signals that control the first and second switches (Sa1 and Sa3) of the second circuit and the third and fourth switches (Sa2 and Sa4) of the third circuit.

For example, power converter circuit 10 may provide to the first-phase load(s) (e.g., connected between terminals (C) and (N)) more power or current than to the second-phase loads (e.g., connected between terminals (D) and (N)) by controlling the fifth switch (Sb1) to conduct the differential current through the first terminal (N). In this case, the RMS current that flows through the fifth switch (Sb1) will be larger than the RMS current that flows through the sixth switch (Sb2) to compensate for the differential current. In this case, the first capacitor (C1), connected between terminals (A) and (N)) may provide the differential current to the first-phase load(s).

In another example, power converter circuit 10 may provide to the second-phase loads (e.g., connected between terminals (D) and (N)) more power or current than to the first-phase load(s) (e.g., connected between terminals (C) and (N)) by controlling the sixth switch (Sb2) to conduct the differential current through the first terminal (N). In this case, the RMS current that flows through the sixth switch (Sb2) will larger than the RMS current that flows through the fifth switch (Sb1). In this case, the second capacitor (C2), connected between terminals (B) and (N)) may provide the differential current to the second-phase load(s).

Figure 2:
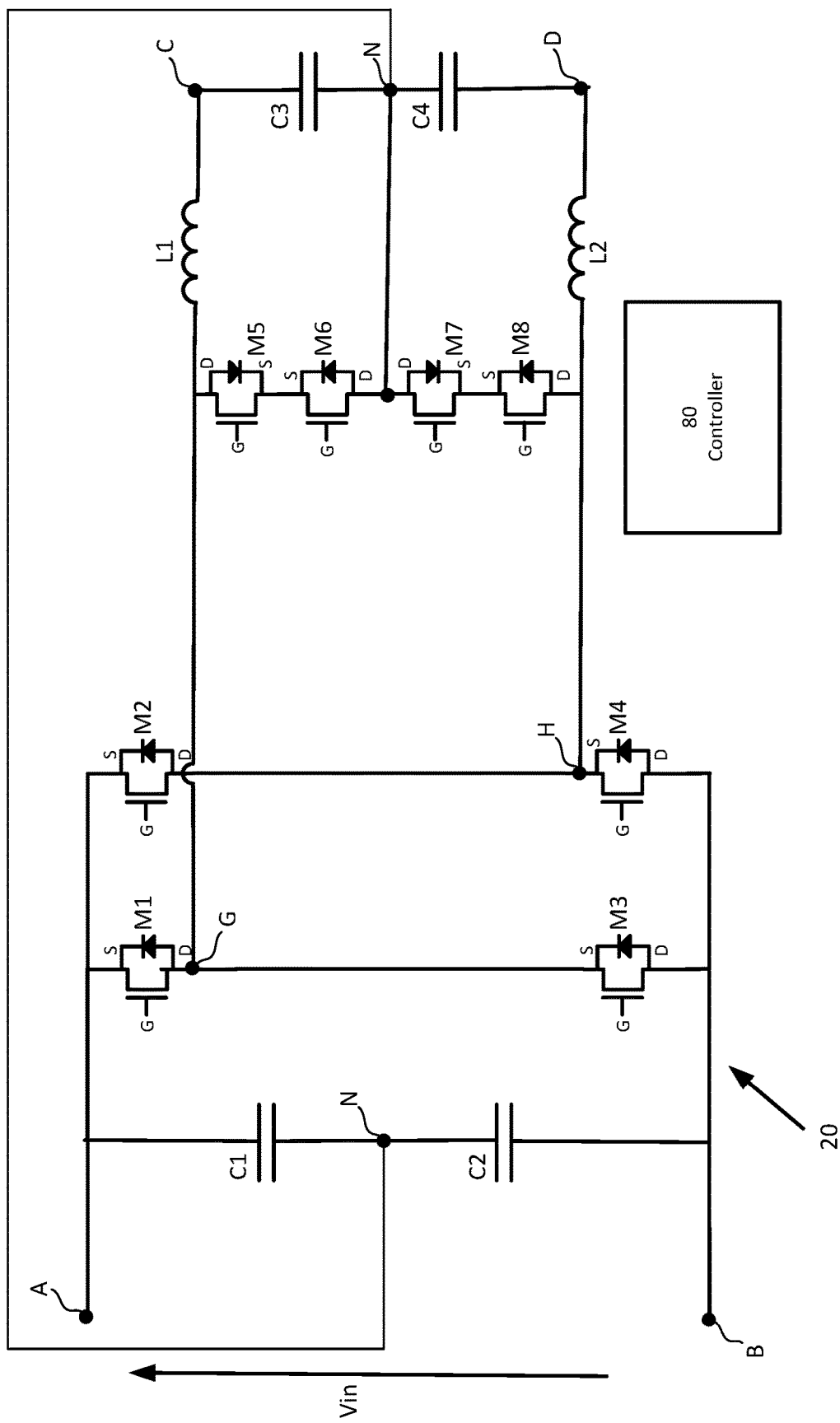

FIG. 2 illustrates a diagram of power converter circuit 20 (e.g., inverter), which is an example of power converter circuit 10 of FIG. 1 utilizing transistors for the switches. In power converter circuit 20, the first switch (Sa1), the second switch (Sa3), the third switch (Sa2), the fourth switch (Sa4), the fifth switch (Sb1) and the sixth switch (Sb2) may be implemented with metal oxide semiconductor field effect transistors (MOSFETs). As shown in FIG. 2, switches Sa1, Sa2, Sa3 and Sa4 are implemented with MOSFETs M1, M2, M3, and M4, and switch Sb1 is implemented with MOSFETs M5 and M6, and switch Sb2 is implemented with MOSFETs M7 and M8. Controller 80 may control each of the MOSFETs as described with respect to FIG. 1. Though MOSFETs are illustrated, any type of transistor or device controllable to operate as a switch by Controller 80 may be used.

MOSFETs M1, M2, M3, M4, M5, M6, M7 and M8 may be an n-type enhancement metal-oxide-semiconductor field-effect transistor comprising drain, source and gate terminals (denoted D, S and G respectively). In this example, controller 80 (with associated driver circuits not shown) may control a voltage difference between the source and gate terminals of MOSFETs M1, M2, M3, M4, M5, M6, M7 and M8, to configure each MOSFET into conducting (ON) and non-conducting (OFF) states.

In some examples, each of switches Sb1 and Sb2 may be implemented by (at least) two series-connected MOSFETs connected in a back-to-back (e.g., source-to-source, drain-to-drain) configuration such that body diodes in the MOSFETS (or external diodes connected across the MOSFET S and D terminals) are oriented in opposite directions (e.g., anode-to-anode or cathode-to-cathode). This back-to-back configuration prevents current from flowing through the diodes when both MOSFETs are OFF and, in some cases, enables switching only a single MOSFET to enable the current flowing.

In one example, as shown in FIG. 2, MOSFETs M5 and M6 (together Sb1) are connected source-to-source, which connects the anode of the body diode of MOSFET M5 to the second terminal (G), the cathode of the body diode of MOSFET M5 to the cathode of the body diode of MOSFET M6, and the anode of the body diode of MOSFET M6 to the first terminal (N). Similarly, MOSFETs M7 and M8 (together Sb2) may be connected source-to-source, which connects the anode of the body diode of MOSFET M7 to the first terminal (N), the cathode of the body diode of MOSFET M7 to the cathode of the body diode of MOSFET M8, and the anode of the body diode of MOSFET M8 to the third terminal (H).

Figure 3:
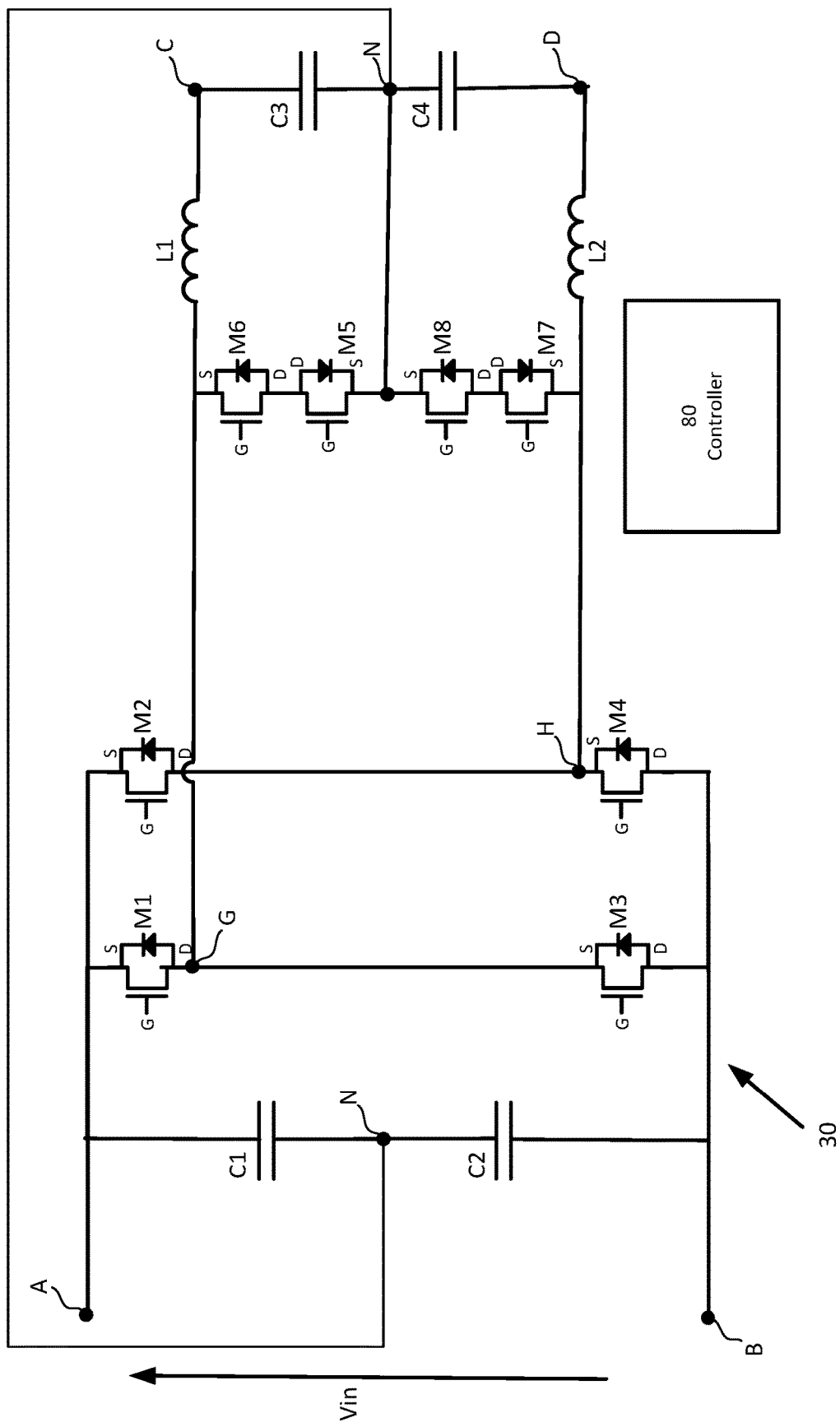

In another example, as shown in FIG. 3, power converter circuit 30 (e.g., inverter), which is similar to power converter circuit 20 of FIG. 2, may include MOSFETs M5-M6 and M7-M8 coupled in another configuration, while still maintaining the back-to-back configuration (e.g., diodes with opposite directions). In power converter circuit 30, MOSFETs M5 and M6 (together Sb1) are connected drain-to-drain, which connects the cathode of the body diode of MOSFET M6 to the second terminal (G), the anode of the body diode of MOSFET M6 to the anode of the body diode of MOSFET M5, and the cathode of the body diode of MOSFET M5 to the first terminal (N). Similarly, MOSFETs M7 and M8 (together Sb2) may be connected drain-to-drain, which connects the cathode of the body diode of MOSFET M8 to the first terminal (N), the anode of the body diode of MOSFET M8 to the anode of the body diode of MOSFET M7, and the cathode of the body diode of MOSFET M7 to the third terminal (H).

Controller 80 may be configured to determine a switching frequency and duty cycle ratio for the switches (e.g., in FIGS. 2-3) and control the switches according to those parameters in the same manner as described above with respect to FIG. 1. For example, controller 80 may be configured to control switches M1, M2, M3, and M4 in the same states as Sa1, Sa2, Sa3, and Sa4, respectively.

Controller 80 may further be configured to control the pair of MOSFETs M5-M6 to collectively conduct (be ON) and not to conduct (be OFF) in the same manner as Sb1 (e.g., at the same switching frequency and duty cycle ratio as Sb1). For example, controller 80 may control both M5 and M6 together (e.g., both ON or both OFF) according to the same pattern as Sb1 as described above with respect to FIG. 1 (e.g., substantially complementary to the state of Sa1 or M1 during positive half-cycles and substantially complementary to Sa2 or M2 during negative half-cycles). In another example, controller 80 may control a first MOSFET (e.g., either MOSFET M5 or M6) of the pair of MOSFETs in the same states as Sb1 (e.g., substantially complementary to the state of Sa1 or M1) during each first half cycle (e.g., positive half) of the sine wave period while maintaining the second MOSFET (e.g., either MOSFET M6 or M5) of the pair of MOSFETS ON throughout the first half cycle. During each second half cycle (e.g., negative half) of the sine wave period, controller 80 may control the second MOSFET (e.g., either MOSFET M6 or M5) of the pair of MOSFETS in the same states as Sb1 (e.g., substantially complementary to the state of Sa2 or M2), while maintaining the first MOSFET (e.g., MOSFET either M5 or M6) ON throughout the second half cycle. This control scheme may reduce switching losses and mean time between failures (MTBF) of the MOSFETs.

Similarly, controller 80 may further be configured to control the pair of MOSFETs M7-M8 to collectively conduct (be ON) and not to conduct (be OFF) in the same manner as Sb2 (e.g. at the same switching frequency and duty cycle ratio as Sb2). For example, controller 80 may control both M7 and M8 together (e.g., both ON or both OFF) according to the same pattern as Sb2 as described above with respect to FIG. 1 (e.g., substantially complementary to the state of Sa1 or M1 during positive half-cycles and substantially complementary to Sa2 or M2 during negative half-cycles). In another example, controller 80 may control a first MOSFET (e.g., either MOSFET M8 or M7) of the pair of MOSFETs in the same states as Sb2 (e.g., substantially complementary to the state of Sa1 or M1) during each first half cycle (e.g., positive half) of the sine wave period while maintaining the second MOSFET (e.g., either MOSFET M7 or M8) of the pair of MOSFETS ON throughout the first half cycle. During each second half cycle (e.g., negative half) of the sine wave period, controller 80 may control the second MOSFET (e.g., either MOSFET M7 or M8) of the pair of MOSFETS in the same states as Sb2 (e.g., substantially complementary to the state of Sa2 or M2), while maintaining the first MOSFET (e.g., either MOSFET M8 or M7) ON throughout the second half cycle.

Figure 4A:
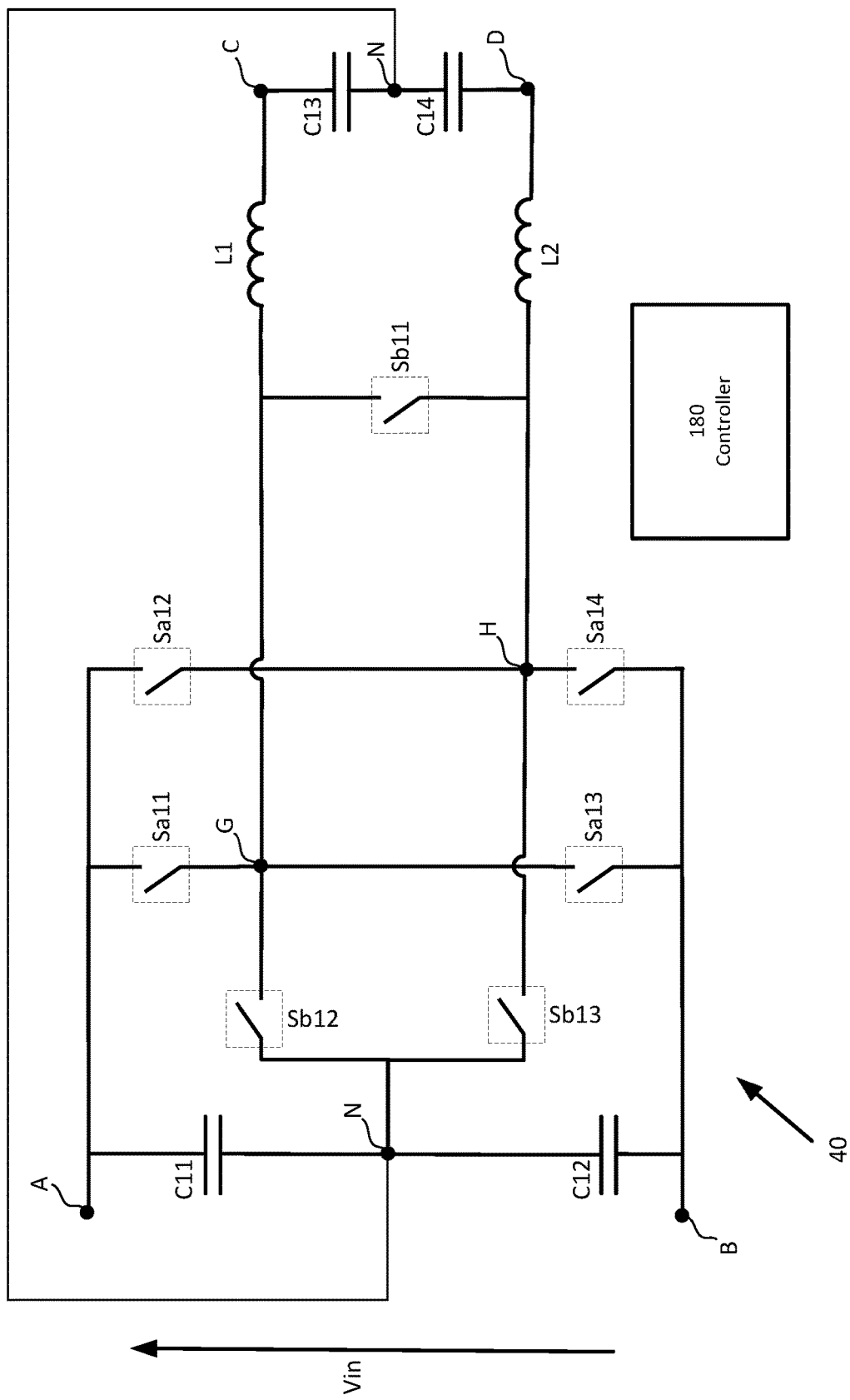

FIG. 4a illustrates a diagram of an example power converter circuit 40 with a single-phase inverter circuit topology (e.g., transformerless single-phase inverter circuit topology). Power converter circuit 40 may be connected to a single-phase or a split-phase (off-grid) load or to a single-phase or split-phase electric power distribution system (e.g., grid, distribution board connected to a grid). In an example of the converter being coupled to a split-phase (off-grid) load, power converter circuit 10 may regulate the output voltage across the loads. Whereas, being coupled to split-phase electric power distribution system, power converter circuit 10 may sync to a voltage regulated by the grid. A direct current (DC) input voltage Vin may be applied across a first input terminal (A) and a second input terminal (B). Input voltage Vin may be a DC voltage received from one or more DC power sources, e.g. a battery, a photovoltaic panel, a rectified source of alternating current (AC) from an AC generator, etc. A first circuit in power converter circuit 40 may be coupled between input terminals (A) and (B). The first circuit may comprise a first capacitor (C11) coupled between input terminal (A) and a first terminal (N), and a second capacitor (C12) coupled between input terminal (B) and the first terminal (N). Terminal (N) may provide a voltage reference, for example, by being be coupled to at least one of a neutral potential, an earth potential, or a reference terminal, and may be the neutral point of the split-phase output. First Terminal (N) is illustrated at two locations (one near the input and one near the output) which are connected together. While the two locations of first terminal (N) are illustrated with a direct connection, the connection between the two locations may be via one or more intermediate connections, such as earth ground, a frame conductor, etc. Each of the first capacitor (C11) and the second capacitor (C12) may comprise one or more capacitors connected in parallel, connected in series or arranged as a combination of parallel and series connections.

A second circuit in power converter circuit 40 may be coupled between input terminals (A) and (B). The second circuit may comprise a first switch (Sa11) coupled between input terminal (A) and a second terminal (G), and a second switch (3) coupled between input terminal (B) and the second terminal (G).

A third circuit in power converter circuit 40 may be coupled between input terminals (A) and (B). The third circuit may comprise a third switch (2) coupled between input terminal (A) and a third terminal (H), and a fourth switch (4) coupled between input terminal (B) and the third terminal (H).

The power converter circuit 40 may further include a first inductor (L1) coupled between the second terminal (G) and a first output terminal (C), and a second inductor (L2) coupled between the third terminal (H) and a second output terminal (D). In some examples, power converter circuit 40 may include only one of the first inductor (L1) and the second inductor (L2). Power converter circuit 40 may be configured to convert a DC input power (with a DC input voltage Vin) across to the input terminals (A) and (B) into an AC output power with an AC voltage across the first output terminal (C) and the second output terminal (D). As further discussed below, one or more of the switches in power converter circuit 40 will be pulse width modulated (PWM). During the pulse duration of the duty cycle, the first inductor (L1) and/or the second inductor (L2) are being charged. During the complementary period of the pulse duration of the duty cycle (e.g., free-wheeling period), the first inductor (L1) and/or the second inductor (L2) are being discharged.

In some variations, a fourth circuit in power converter circuit 40 may additionally be included and coupled across the first output terminal (C) and the second output terminal (D). The fourth circuit may include a third capacitor (C13) and a fourth capacitor (C14). The third capacitor (C13) may be coupled between the first output terminal (C) the first terminal (N). The fourth capacitor (C14) may be coupled between the first output terminal (D) and the first terminal (N). As illustrated, first terminal (N) includes an intermediate point at the input between the first capacitor (C11) and the second capacitor (C12), and includes an intermediate point at the output between the third capacitor (C13) and the fourth capacitor (C14) (as already described, the intermediate points may be physically separated, but electrically connected). According to some aspects, a single capacitor or parallel-connected capacitors may replace the third capacitor (C13) and the fourth capacitor (C14).

As with power converter circuits 10, 20 and 30, the first output terminal (C), the second output terminal (D), and the first terminal (N) may form an interface to a split-phase (off-grid) load or distribution (e.g., grid, distribution board connected to a grid) system in which an AC voltage is generated between the first output terminal (C) and the second output terminal (D) as described above.

Different loads may be coupled across terminals (C) and (N) and across (D) and (N) respectively. For example, a first-phase load(s), comprising one or more loads, may be coupled across terminals (C) and (N), and may comprise various components/elements (e.g., inductance, resistance, capacitance). A second-phase load(s), comprising one or more loads, may be coupled across terminals (D) and (N), and may various other components/elements (e.g., inductance, resistance, capacitance). As with power converter circuits 10, 20 and 30, in referring to the first-phase load(s) and second-phase load(s) below with respect to power converter circuit 40 and all other power converter circuits described herein, the first-phase load(s) or the second-phase load(s) may include no load, while the other phase has at least one load, which is one example of an imbalance between the phases. In some examples, third capacitor (C13) and fourth capacitor (C14) may represent an equivalent or a total capacitance of each load across terminals (C) and (N) and across (D) and (N), respectively. Power converter circuit 40 may be configured to provide power (e.g., first and second phase AC power, respectively) to the first-phase load(s) and the second-phase load(s) based on the load characteristics. For example, power converter circuit 40 may provide current of different magnitudes and/or phases to each of the first-phase load(s) and the second-phase load(s), based on load power consumption or other determined criterion (e.g., different respective load impedances). In another example, power converter circuit 40 may provide voltage at different magnitudes and/or phases to each of the first-phase load(s) and the second-phase load(s) based on a determined criterion. Criterion applied for determining the currents may be different than criterion applied for determining voltages.

A fifth circuit in power converter circuit 40 may be coupled across the second terminal (G) and the third terminal (H). The fifth circuit may comprise a fifth switch (Sb11) coupled between the second terminal (G) and the third terminal (H).

A sixth circuit in power converter circuit 40 may be coupled across the second terminal (G) and the third terminal (H). The sixth circuit may comprise a sixth switch (Sb12) coupled between the first terminal (N) and the second terminal (G), and a seventh switch (Sb13) coupled between the first terminal (N) and the third terminal (H).

Power converter circuit 40 may additionally comprise or be connected to a controller 180 (e.g., a digital signal processing (DSP) circuit, a field programmable gate array (FPGA) device, embedded controller etc.). Controller 180 may be configured to control power converter circuit 40 and its components (for example, switches, voltages, etc.) based on a predetermined algorithm, a measured parameter (e.g., a measurement collected by one or more sensors), a calculated parameter, an estimated parameter (e.g., based on one or more measured parameters), a determined parameter (e.g., based on a combination of algorithm, measure parameter, calculated parameter, and/or estimated parameter) or any other appropriate data. As an example, such parameter may include an electrical parameter including: current, voltage, power, frequency, etc. Controller 180 may comprise or be coupled to sensors configured to measure or sense one or more electrical parameters of power converter circuit 40. Based on the measurement or the sensing of the one or more electrical parameters of power converter circuit 40, controller 180 may determine load characteristics of the first-phase load(s) (e.g., connected between terminals (C) and (N)) and/or the second-phase load(s) (e.g., connected between terminals (D) and (N)), and/or phase imbalance (or balance) of current through or voltage across the first-phase load(s) and the second-phase load(s). Phase imbalance may occur when the power converter circuit 40 (via the first output terminal (C), the second output terminal (D), and the first terminal (N)) forms an interface to a split-phase (off-grid) load or distribution (e.g., grid, distribution board connected to a grid) system in which an AC voltage is generated between the first output terminal (C) and the second output terminal (D).

Controller 180 may be configured to control and switch (turn on and off) one or more switches, including: the first switch (Sa11), the second switch (3), the third switch (2), the fourth switch (4), the fifth switch (Sb11), the sixth switch (Sb12) and the seventh switch (Sb13). Controller 180 may control the one or more switches based on a reference signal (e.g., digital, analog) that comprises a sine wave. A frequency of the sine wave frequency may correspond to an output frequency of AC power output by converter circuit 40.

Additionally or alternatively, controller 180 may use another (e.g., second) reference signal (e.g., a clock signal) to switch the one or more switches, at a switching frequency, based on a duty cycle ratio. The switching frequency may be higher than the sine wave frequency of the reference signal (e.g., 1 kHz to greater than 100 MHz, such as 16 kHz, 25 kHz, 50 kHz, 100 kHz, 1 MHz, 100 MHz, a variable frequency of 16 kHz-100 MHz etc.). The duty cycle ratio may be determined in the same manner as described above with respect to FIGS. 1-3. In some examples, one or more switches of: the first switch (Sa11), the second switch (3), the third switch (2), the fourth switch (4), the fifth switch (Sb11) and the sixth switch (Sb12), and the seventh switch (sb13) may be controlled by another component (e.g., another controller, passive components).

In some examples, controller 180 may control the first switch (Sa11), in correspondence with (e.g., at the same time and state as) the fourth switch (4), at a switching frequency based on a duty cycle ratio during positive half of the reference signal. During negative half of the reference signal, controller 180 may control the first switch (Sa11) and the fourth switch (4) to be OFF. Controller 180 may control the second switch (3), in correspondence with (e.g., at the same time and state as) the third switch (2), at the switching frequency based on the duty cycle ratio during the negative half of the reference signal, and to be OFF during the positive half of the reference signal.

Which of the one or more switches in circuit (40) are switched based on the duty cycle ratio may be based on whether the reference signal is positive or negative (e.g., during positive and negative halves of a sine wave). During the positive half of the reference signal, controller 180 may control the fifth switch (Sb11) substantially (e.g., neglecting dead time, rise and fall time, etc.) in a complementary manner with respect to the first switch (Sa11) and the fourth switch (4). During negative half of the reference signal, controller 180 may control the fifth switch (Sb11) substantially (e.g., neglecting dead time, rise and fall time, etc.) in a complementary manner with respect to the second switch (3) and the third switch (2). In some examples, other switches of circuit (40) may be turned off for duration (e.g., to reduce switching losses, one of the first-phase load(s) or the second-phase loads(s) includes no load).

Controller 180 may sense the load power consumption of the first-phase load(s) and the second-phase load(s). In some examples, based on detecting a balanced load power consumption of the first-phase load(s) and the second-phase load(s), controller 180 may maintain OFF (e.g., not turn ON) the sixth switch (Sb12) and the seventh switch (Sb13) of the sixth circuit. Thereby, reducing switching losses of power converter circuit 40.

Based on detecting an imbalance between the load power consumption of the first-phase load(s) and the second-phase load(s), controller 180 may control at least one of the sixth switch (Sb12) and the seventh switch (Sb13) of the sixth circuit, according to a control scheme to provide the differential power/current/voltage. According to some aspects, the sixth circuit may be configured to conduct a difference (e.g., differential current) between the first and the second current through a switched path in circuit (40) via terminal (N).

As an example, the control scheme may be according to the following modulation. During the positive half of the reference signal, controller 180 may control the sixth switch (Sb12) and/or the seventh switch (Sb13) substantially (e.g., neglecting dead time, rise and fall time, etc.) in a complementary manner with respect to the first switch (Sa11) and the fourth switch (Sa14) and in correspondence with (e.g., substantially at the same time neglecting dead time, rise and fall time, etc.) the fifth switch (Sb11). During negative half of the reference signal, controller 180 may control the sixth switch (Sb12) and/or the seventh switch (Sb13) substantially (e.g., neglecting dead time, rise and fall time, etc.) in a complementary manner with respect to the second switch (3) and the third switch (2) and in correspondence with (e.g., substantially at the same time neglecting dead time, rise and fall time, etc.) the fifth switch (Sb11).

In some examples, phase imbalance between a first-phase load (e.g., connected between terminals (C) and (N)) and a second-phase load (e.g., connected between terminals (D) and (N)) may occur when one of the loads is drawing more power than the other load, a phase difference between the loads occurs (e.g. due to different reactiveness). In such a case, the topology of power converter circuit 40 with the control scheme (implemented by controller 180) may control the differential current (the difference between the current drawn by the first-phase load and the current drawn by the second-phase load) to flow through the first terminal (N).

For example, power converter circuit 40 may provide to the first-phase load(s) that is coupled to the output (e.g., connected between terminals (C) and (N)) more power/current than the second-phase load(s) that is coupled to the output (e.g., connected between terminals (D) and (N)) by controlling the sixth switch (Sb12) and optionally the seventh switch (Sb13) to conduct the differential current to the first terminal (N). In this case, the RMS current that flows through the sixth switch (Sb12) will be larger than the RMS current that flows through fifth switch (Sb11) and the seventh switch (Sb13) to compensate for the differential current. The current flowing through the sixth circuit may be in correspondence to (e.g., be proportional to) the impedance ratio between the equivalent impedance of the fifth switch (Sb11) and the seventh switch (Sb13) and the equivalent impedance of the sixth switch (Sb12). The impedance ratio affects the current division among the switches. Thus, current flowing through the sixth switch (Sb12) of the sixth circuit may be larger than the differential current.

In another example, power converter circuit 40 may provide to the second-phase load(s) (e.g., connected between terminals (D) and (N)) more power/current than the first-phase load(s) (e.g., connected between terminals (C) and (N)), by controlling the seventh switch (Sb13) and optionally the sixth switch (Sb12) to conduct the differential current to the first terminal (N). In this case, the RMS current that flows through the seventh switch (Sb13) may be larger than the RMS current that flows through the fifth switch (Sb11) and the sixth switch (Sb12).

In some examples, based on sensing by Controller 180 a low load power consumption of the first-phase load(s) and the second-phase load(s), controller 180 may vary the modulation of the fifth circuit and the sixth circuit. For example, based on detecting a balanced and low load power consumption of the first-phase load(s) and the second-phase load(s), controller 180 may operate the fifth circuit and maintain OFF the switches of the sixth circuit. In another example, based on detecting an unbalanced and low load power consumption of the first-phase load(s) and the second-phase load(s) (e.g., larger load power consumption of the first-phase load(s)), controller 180 may operate the sixth circuit and maintain OFF the switch(es) of the fifth circuit. In such a case, controller 180 may operate only the sixth switch (Sb12) of the sixth circuit, and maintain OFF the seventh switch (Sb13).

In some examples, power converter circuit 40 may be used as a rectifier ((e.g., synchronous and/or nonsynchronous rectifier). In this case, the power converter circuit is capable of providing a direct current (DC) voltage at the DC terminals (e.g., previously described as the input) from a predetermined alternating current (AC) voltage level applied at the AC terminals (e.g., previously described as the output).

Figure 4B:
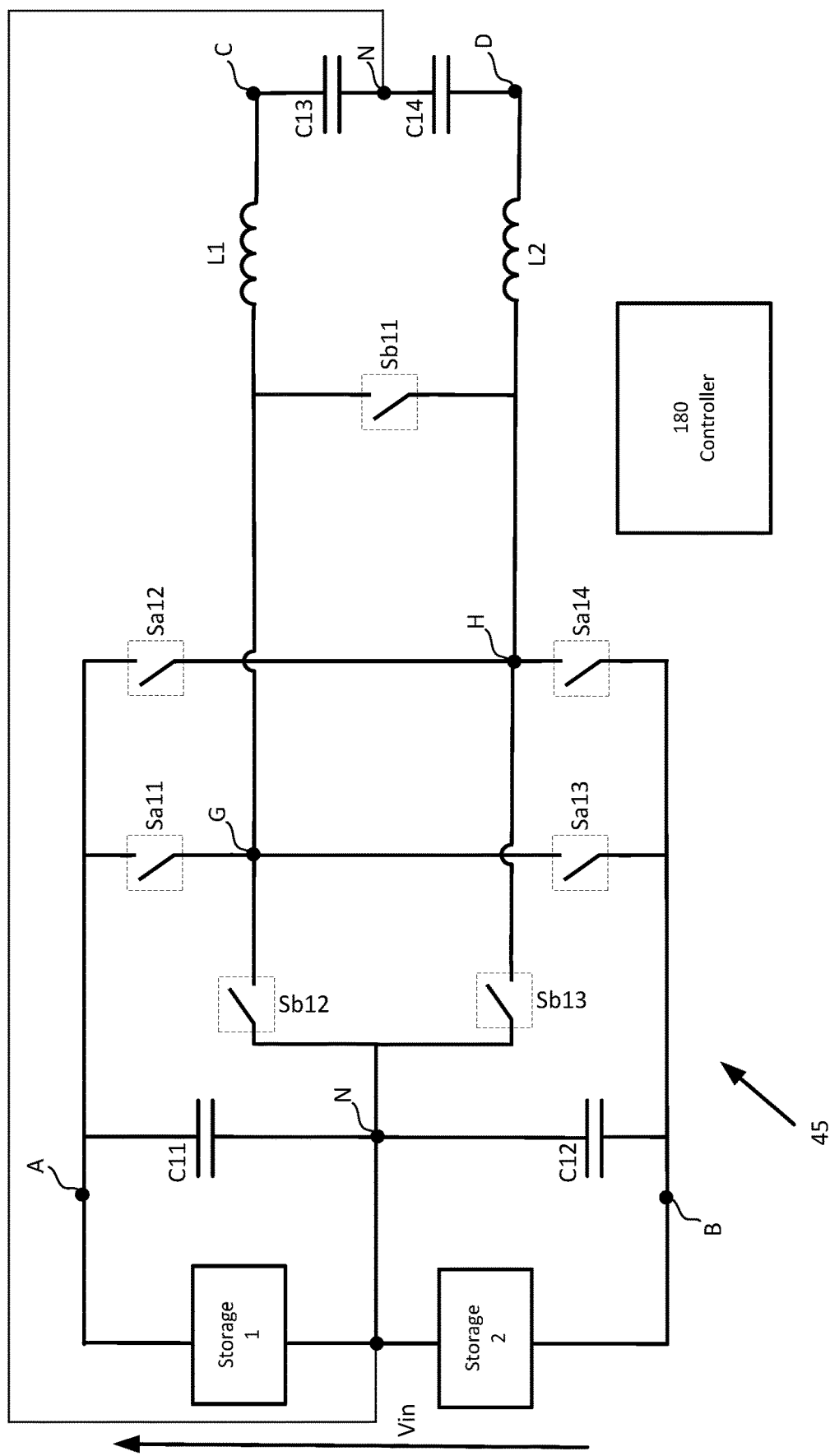

FIG. 4b illustrates a diagram of power converter circuit 45 (e.g., inverter, rectifier), which is an example of power converter circuit 40 of FIG. 4a utilizing storage circuits, e.g., a first storage circuit (Storage1) coupled across input terminal (A) and the first terminal (N), and a second storage circuit (Storage2) coupled across the first terminal (N) and input terminal (B).

The first storage circuit (Storage1) and the second storage circuit (Storage2) may comprise a battery (e.g., a lithium ion battery, lead-acid batteries, solid-state batteries, a redox flow battery), supercapacitors, flywheel, a capacitor array, etc. The first storage circuit (Storage1) and the second storage circuit (Storage2) may further comprise a storage interface, power manager, meter, sensors, power converter, switches to connect and disconnect from at least one of input terminal (A), input terminal (B), and the first terminal (N), etc.

The first storage circuit (Storage1) and the second storage circuit (Storage2) may be configured to provide power in response to fast and/or sudden and/or high-frequency variations at the first output terminal (C) and the second output terminal (D). As discussed above, a first-phase load may be coupled between terminals (C) and (N) and a second-phase load may be coupled between terminals (D) and (N). A fast and/or sudden and/or high-frequency change one of the first-phase load or the second-phase load may generate an imbalance between the first electrical load and the second electrical.

According to some aspects of the disclosure, the first storage circuit (Storage1) and the second storage circuit (Storage2) may be configured to provide power in response to fast and/or sudden and/or high-frequency variations at input terminal (A) and input terminal (B).

The first storage circuit (Storage1) and the second storage circuit (Storage2) may be configured to respond to these load variations faster than the first capacitor (C11) and the second capacitor (C12), which may be configured to stabilize an approximate balanced Vin voltage across input terminal (A) and input terminal (B).

Figure 5A:
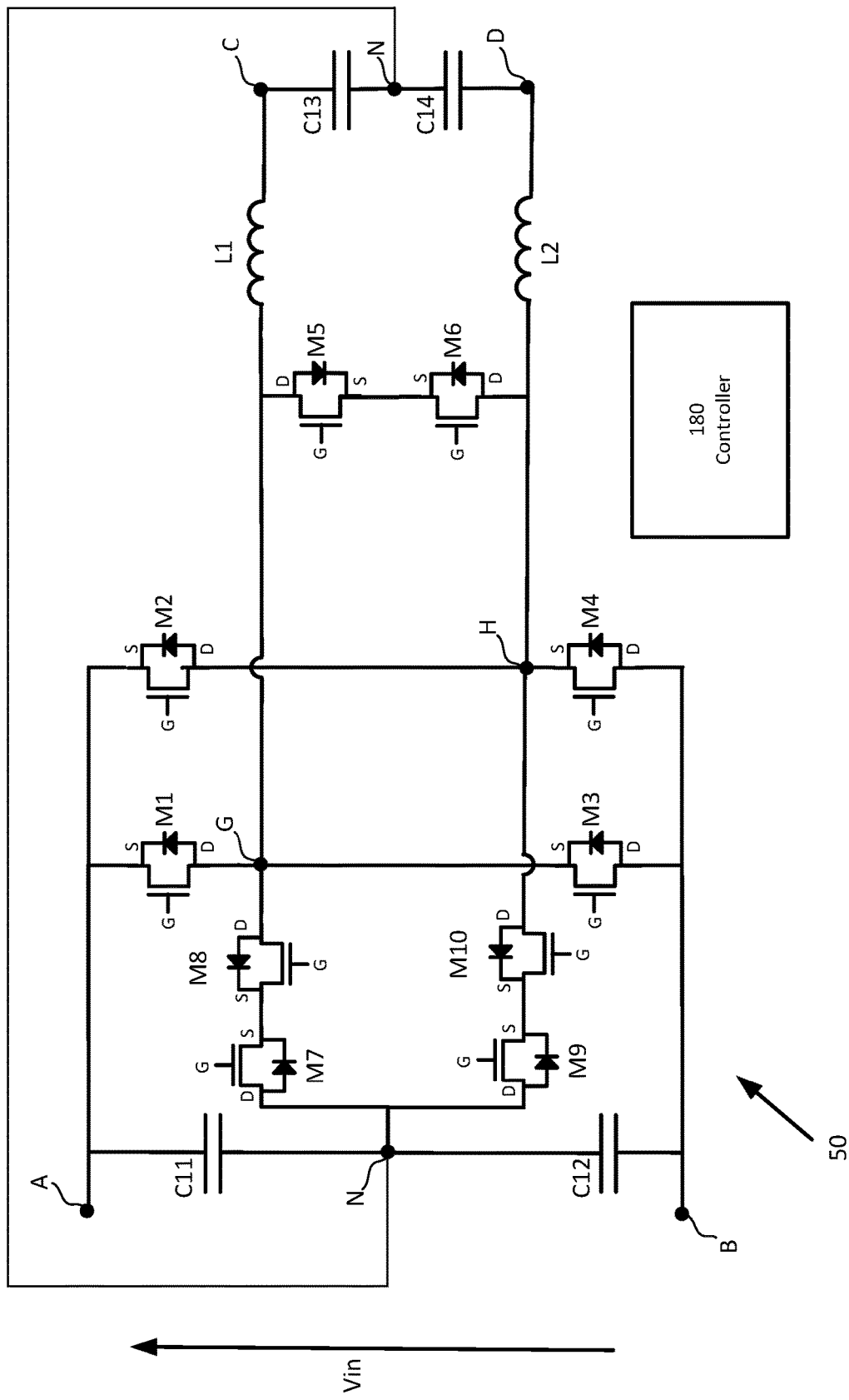

A first storage circuit and a second storage circuit, similar to the first storage circuit (Storage1) and the second storage circuit (Storage2) of FIG. 4b, may be connected across input terminal (A) and the first terminal (N), and across the first terminal (N) and input terminal (B) of power converter circuit 10, power converter circuit 20, power converter circuit 30, power converter circuit 40, power converter circuit 50, power converter circuit 55, power converter circuit 100, power converter circuit 110, and power converter circuit 140 of FIGS. 1, 2, 3, 4a, 4b, 5, 5b, 10, 11, and 14 respectively FIG. 5a illustrates a diagram of power converter circuit 50 (e.g., inverter, rectifier), which is an example of power converter circuit 40 of FIG. 4a utilizing transistors for the switches, which may be the same types of transistors, and which may be controlled in the same manner by controller 180, as discussed above with respect to FIGS. 1-4.

In some examples, switches Sa11, 2, 3 and 4 of FIGS. 4a and 4b are implemented with MOSFETs M1, M2, M3, and M4, and switch Sb11 is implemented with MOSFETs M5 and M6, and switch Sb12 is implemented with MOSFETs M7 and M8, and switch Sb13 is implemented with MOSFETs M9 and M10. Controller 180 may control each one of MOSFETs M1, M2, M3, M4, M5, M6, M7, M8, M9 and M10.

MOSFETs M1, M2, M3, M4, M5, M6, M7, M8, M9 and M10 may be an n-type enhancement metal-oxide-semiconductor field-effect transistor comprising drain, source and gate terminals (denoted D, S and G respectively). In this example, controller 180 (with associated driver circuits not shown) may control the voltage difference between the source and gate terminals of MOSFETs M1, M2, M3, M4, M5, M6, M7, M8, M9 and M10 to configure each MOSFET into conducting (ON) and non-conducting (OFF) states.

In some examples, each of switches Sb11, Sb12, and Sb13 may be implemented by (at least) two series-connected MOSFETs connected in a back-to-back (e.g., source-to-source, drain-to-drain) configuration such that body diodes in the MOSFETS (or external diodes connected across the MOSFET S and D terminals) are oriented in opposite directions (e.g., anode-to-anode or cathode-to-cathode). This back-to-back configuration prevents current from flowing through the diodes when both MOSFETs are OFF.

For example, the anode of the body diode of MOSFET M5 may be coupled with the second terminal (G), the cathode of the body diode of MOSFET M5 may be coupled with the cathode of the body diode of MOSFET M6, and the anode of the body diode of MOSFET M6 may be coupled with the third terminal (H). The anode of the body diode of MOSFET M8 may be coupled with the second terminal (G), the cathode of the body diode of MOSFET M8 may be coupled with the cathode of the body diode of MOSFET M7, and the anode of the body diode of MOSFET M7 may be coupled with the first terminal (N). Similarly, the anode of the body diode of MOSFET M9 may be coupled with the first terminal (N), the cathode of the body diode of MOSFET M9 may be coupled with the cathode of the body diode of MOSFET M10, and the anode of the body diode of MOSFET M10 may be coupled with the third terminal (H). In other embodiments M5 and M6, M7 and M8, and M9 and M10 may be connected drain-to-drain in the same manner as M5 and M6 (and M7 and M8) are connected in FIG. 3.

Controller 180 may be configured to determine a switching frequency and duty cycle ratio for the switches (e.g., in FIG. 5a) and control the switches according to those parameters in the same manner as described above with respect to FIGS. 1, 2, 3, 4a and 4b. For example, controller 180 may be configured to control switches M1, M2, M3, and M4 of FIG. 5a in the same states as Sa1, Sa2, Sa3, and Sa4 of FIG. 4a, respectively.

In some examples, controller 180 may further be configured to control the MOSFETs of each M5-M6, M7-M8, and M9-M10 pair together in FIG. 5a to collectively conduct (be ON) and not to conduct (be OFF) in the same pattern as Sb11, Sb12, and Sb13 (e.g., at the same switching frequency and duty cycle ratio as Sb11, Sb12, and Sb13) of FIG. 4a, respectively. For example, controller 180 may control both MOSFETS of each pair (M5-M6, M7-M8, and M9-M10) together (e.g., both ON or both OFF) according to the same pattern as Sb11, Sb12, and Sb13 as described above with respect to FIG. 4a (e.g., substantially complementary to the state of Sa1 or M1 during positive half-cycles and substantially complementary to Sa2 or M2 during negative half-cycles). In another example, controller 180 may control a first MOSFET (e.g., either MOSFETs M6 or M5, M8 or M7, M10 or M9) of each pair in the same states as the Sb11, Sb12, Sb13 (e.g., substantially complementary to the state of Sa1 or M1), respectively, during each first half cycle (e.g., positive half) of the sine wave period while maintaining the second MOSFET (e.g., either MOSFETs M5 of M6, M7 or M8, M9 or M10) of each pair ON throughout the first half cycle. During each second half cycle (e.g., negative half) of the sine wave period, controller 180 may control the second MOSFET (e.g., either MOSFETs M5 of M6, M7 or M8, M9 or M10) of each pair in the same states as Sb11, Sb12, Sb13 (e.g., substantially complementary to the state of Sa2 or M2), respectively, while maintaining the first MOSFET (e.g., either MOSFETs M6 or M5, M8 or M7, M10 or M9) ON throughout the second half cycle. This control scheme may reduce switching losses and mean time between failures (MTBF) of the MOSFETs.

According to some aspects of the disclosure, controller 180 may vary the modulation to reduce switching losses. For example, based on the power converter circuit 50 detecting balanced load power consumption of the first-phase load(s) and the second-phase load(s) (e.g., interfaced to a balanced off-grid load) or based on the power converter circuit being interfaced to an electric power distribution system (e.g., grid, distribution board connected to a grid) that is capable of providing the differential current to unbalanced loads, controller 180 may maintain OFF (e.g., not turn ON) the sixth circuit: MOSFETs M7, M8, M9 and M10. In that case, when MOSFETs M2 and M3 conduct, the current flows via MOSFETs M5 and M6 of the fifth circuit.

According to some aspects of the disclosure, phase imbalance between the first electrical load (e.g., connected between terminals (C) and (N)) and the second electrical load e.g., connected between terminals (D) and (N)) may occur when one of the loads is drawing more power than the other load. In such a case, the topology of power converter circuit 50 with the control scheme (implemented by controller 180) may control the sixth circuit to conduct the differential current (the difference between the current drawn by the first-phase load and the current drawn by the second-phase load) to flow through a switched path via the first terminal (N). Based on detecting an imbalance between the load power consumption of the first-phase load(s) and the second-phase load(s), controller 180 may control and switch at least one of the MOSFETs pair of M9-M10 and/or M7-M8 of the sixth circuit, according to a control scheme to provide the differential power/current/voltage.

The current flowing through the sixth circuit may be in correspondence to (e.g., proportional to) the impedance ratio between the impedance of MOSFETs M7-M8 and the impedance of MOSFETs M9-M10. The impedance ratio may affect the current division among the two switches.

For example, power converter circuit 50 may provide to a first-phase load that is coupled (e.g., connected between terminals (C) and (N)) more power/current than a second-phase load that is coupled (e.g., connected between terminals (D) and (N)) by controlling, MOSFETs M7-M8 and optionally MOSFETs M9-M10 to conduct the differential current to the first terminal (N). In the case of controlling MOSFETs M7-M8 and M9-M10 (e.g., assuming all of the MOSFETS may have the same properties, such as drain-source on resistance), the differential current may flow in two main Kirchhoff's loops: i) via MOSFETs M7-M8 and L1 to/from C13 and C11, and ii) via MOSFETs M9-M10 and M5-M6, and L1 to/from C13. Due to a lower resistance of loop (i) in comparison to loop (ii) (drain-source on resistance of two MOSFETs vs four MOSFETs), a larger current may flow through loop (i) (through MOSFETS M7-M8) in comparison to the current that flows loop (ii) (through MOSFETS M5-M6 and M9-M10).

In another example, the second-phase load (e.g., connected between terminals (D) and (N)) may draw more power/current than the first-phase load (e.g., connected between terminals (C) and (N)). In this case, the RMS current that flows through MOSFETs M9-M10 may be larger than the RMS current that flows through MOSFETs M7-M8 and MOSFETs M5-M6.

In another example, the first-phase load and the second-phase load are phase balanced (or substantially phase balanced) by drawing equal current (or substantially equal current). In this case, a larger current may flow via MOSFETs M5-M6 compared to the current that flows through MOSFETs M7-M8 and M9-M10 (drain-source on resistance of two MOSFETs vs four MOSFETs). An example for the currents flowing in power converter circuit 50 in the case of phase imbalanced loads is provided below with respect to FIGS. 9a-9c.

In some examples, based on sensing by Controller 180 a low load power consumption of the first-phase load(s) and the second-phase load(s), controller 180 may vary the modulation of the fifth circuit and the sixth circuit. For example, based on detecting a balanced and low load power consumption of the first-phase load(s) and the second-phase load(s), controller 180 may operate the fifth circuit (MOSFETs M5-M6) and maintain OFF the switches of the sixth circuit (MOSFETs M7-M8 and M9-M1.0). In another example, based on detecting a unbalanced and low load power consumption of the first-phase loads) and the second-phase load(s) (e.g., larger load power consumption of the first-phase load(s)), controller 180 may operate the sixth circuit (MOSFETs M7-M8 and optionally MOSFETs M9-M10) and maintain OFF the MOSFETs of the fifth circuit. In such a case, controller 180 may operate only MOSFETs M7-M8 of the sixth circuit, and maintain OFF MOSFETs M9-M10 to reduce switching losses. In case the load power consumption of the second-phase load(s) is low, however larger than the load power consumption of the first-phase load(s), controller 180 may operate only MOSFETs M9-M10 of the sixth circuit, and maintain OFF MOSFETs M7-M8.

In some examples, power converter circuit 50 may be used as a rectifier (e.g., synchronous and/or nonsynchronous rectifier). In this case, the power converter circuit is capable of providing a direct current (DC) voltage at the DC terminals (e.g., previously described as the input) from a predetermined alternating current (AC) voltage level applied at the AC terminals (e.g., previously described as the output).

Figure 5B:
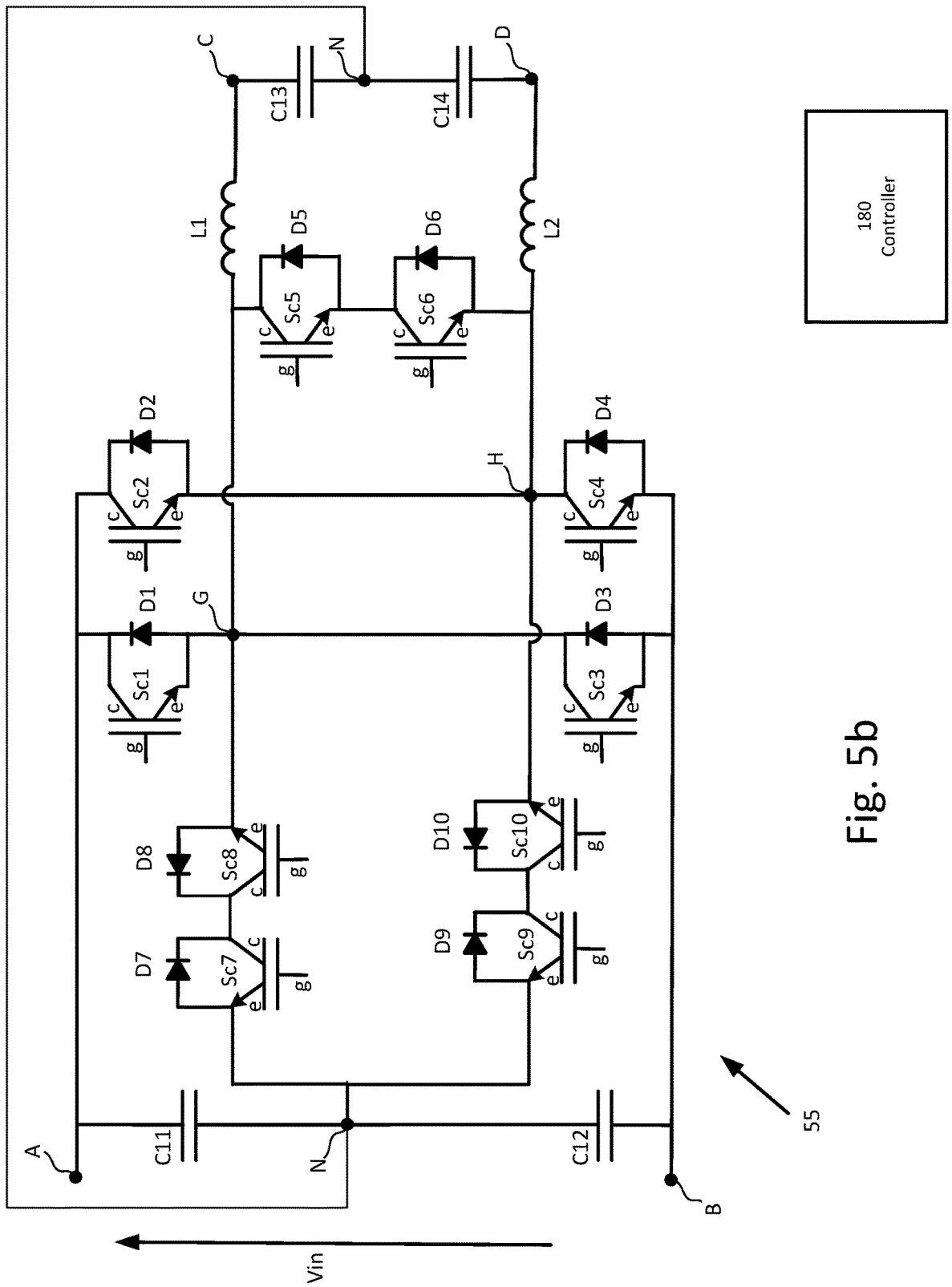

FIG. 5b illustrates a diagram of power converter circuit 55 (e.g., inverter, rectifier), which is an example of power converter circuit 50 of FIG. 5a utilizing insulated-gate bipolar transistors (IGBTs) for the MOSFETs, which may be the same types of transistors, and which may be controlled in the same manner by controller 180, as discussed above with respect to FIGS. 1-3, 4a-4b and 5a. A diode may be coupled across each insulated-gate bipolar transistor (IGBT), where the anode of the diode coupled to the emitter (e) of the IGBT, and the cathode of the diode coupled to the collector (c) of the IGBT.

In some examples, MOSFETs M1, M2, M3, M4, M5, M6, M7, M8, M9, and M10 of FIG. 5a are implemented with IGBTs and diodes. MOSFET M1 is implemented with IGBT Sc1 coupled across D1, MOSFET M2 is implemented with IGBT Sc2 coupled across D2, MOSFET M3 is implemented with IGBT Sc3 coupled across D3, MOSFET M4 is implemented with IGBT Sc4 coupled across D4, MOSFET M5 is implemented with IGBT Sc5 coupled across D5, MOSFET M6 is implemented with IGBT Sc6 coupled across D6, MOSFET M7 is implemented with IGBT Sc7 coupled across D7, MOSFET M8 is implemented with IGBT Sc8 coupled across D8, MOSFET M9 is implemented with IGBT Sc9 coupled across D9, and MOSFET M10 is implemented with IGBT Sc10 coupled across D10. Controller 180 may control each one of IGBTs Sc1, Sc2, Sc3, Sc4, Sc5, Sc6, Sc7, Sc8, Sc9 and Sc10.

Controller 180 may be configured to determine a switching frequency and duty cycle ratio for the IGBTs (e.g., in FIG. 5b) and control the switches according to those parameters in the same manner as described above with respect to FIGS. 1, 4a, 4b, and 5a. For example, controller 180 may be configured to control IGBTs Sc1, Sc2, Sc3, Sc4, Sc5, Sc6, Sc7, Sc8, Sc9 and Sc10 and its each own diode, in the same states as MOSFETs M1, M2, M3, M4, M5, M6, M7, M8, M9, and M10 of FIG. 5a, respectively.

Figure 6:
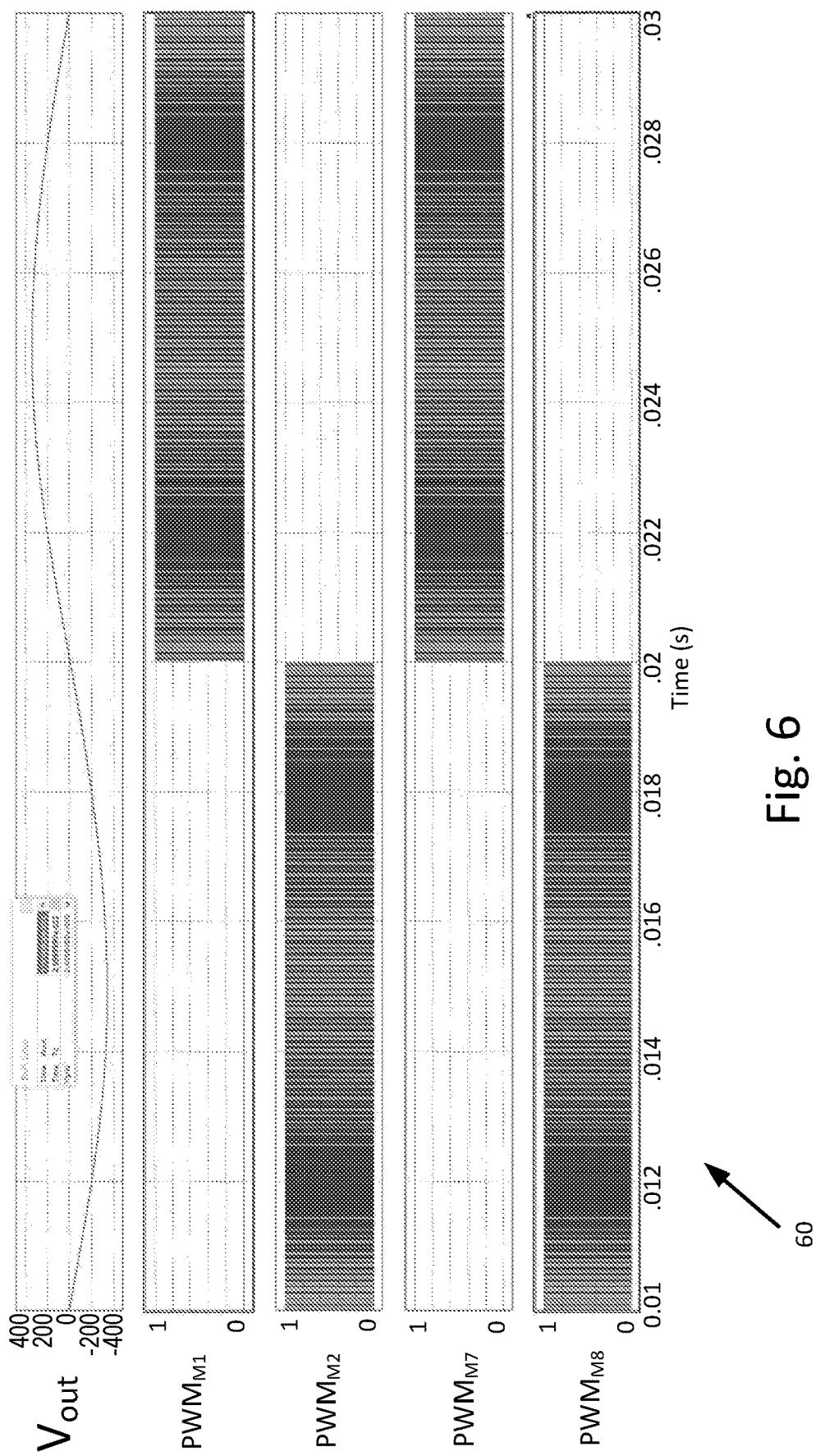
FIGS. 6-8 illustrates example timing diagrams of control signals of various switches in the electrical circuits of FIGS. 1-3, 4a-4b, 5a-5b, 10-11 and 14.

FIG. 6, illustrates timelines 60 showing waveforms resulting from an example control method of a power converter circuit (e.g., power converter circuits 20, 30, 40, 50, 100, and 110 of FIGS. 2-5 and 10-11). The upper graph shows a waveform, in volts (V) versus time, for output voltage Vout. Output voltage Vout may be an AC output voltage at either one of the output terminals C or D with respect to a reference voltage (e.g., terminal (N), neutral potential terminal, an earth potential terminal). Vout may be filtered by a filter circuit (e.g., comprising a capacitor) to generate a substantially AC sinusoidal voltage waveform at the output of the filter circuit. In the example shown in FIG. 6, output voltage Vout may be a 50 Hz sine-waveform of $230V_{RMS}$ (though Vout could be other frequencies and voltages such as 60 Hz and $240V_{RMS}$). Graphs $PWM_{M2}$, $PWM_{M1}$, $PWM_{M8}$ and $PWM_{M7}$ illustrate PWM control signals (and represent equivalent control signals $PWM_{A1}$, $PWM_{A2}$, and $PWM_{B}$) used to control the switches of the power converter circuits 10, 20, 30, 40, 50, 100, and 110 of FIGS. 1-5 and 10-11.

For example, for the circuits illustrated in of FIGS. 2, 3, 5, and 11, $PWM_{M1}$ (or one or more substantially identical signals) may control each of MOSFETs M1 and M4; $PWM_{M2}$ (or one or more substantially identical signals) may control each of MOSFETs M2 and M3; $PWM_{M7}$ may control one MOSFET of each M5-M6, M7-M8, and M9-M10 MOSFET pair (e.g., MOSFETs M5, M7, and M9); and $PWM_{M8}$ may control the other MOSFET of each M5-M6, M7-M8, and M9-M10 MOSFET pair (e.g., MOSFETs M6, M8, and M10). These signals may also control the corresponding switches of FIGS. 1, 4, and 10, except that the Sb1, Sb2, and Sb3 switches would be controlled with a PWM control signal that is the logical "AND" of $PWM_{M7}$ and $PWM_{M8}$. Specifically, switches Sa1 and Sa4 may be controlled with a signal $PWM_{A1}$ (or one or more substantially identical signals) that is the same as $PWM_{M1}$, switches Sa2 and Sa3 may be may be controlled with a signal $PWM_{A2}$ (or one or more substantially identical signals) that is the same as $PWM_{M2}$, and switches Sb1, Sb2, and Sb3 may be controlled with a signal $PWM_B$ (or one or more substantially identical signals) that is the same as ($PWM_{M7}$ AND $PWM_{M8}$). A PWM control signal value of "1" (high) indicates controlling the corresponding switch ON, and a PWM control signal value of "0" (low) indicates controlling the corresponding switch OFF.

The $PWM_{M2}$, $PWM_{M1}$, $PWM_{M8}$ and $PWM_{M7}$ signals may be generated by digital encoding component(s) (e.g., a microprocessor) and/or analog circuit(s) (e.g., using a comparator, oscillator, etc.). For example, $PWM_{M2}$, $PWM_{M1}$, $PWM_{M8}$ and $PWM_{M7}$ signals may be generated by controller 80, controller 180 or controller 280.

In the example shown in FIG. 6, signals $PWM_{M2}$, $PWM_{M1}$, $PWM_{M8}$ and $PWM_{M7}$ may have a pattern that repeats each period of the output voltage Vout (e.g., 0 for half of the 50 Hz period and pulse width modulated for the other half of the period). Signals $PWM_{M2}$ and $PWM_{M8}$ may be complementary with respect to each other, and signals $PWM_{M1}$ and $PWM_{M7}$ may be complementary with respect to each other. For example, for the MOSFETS illustrated in FIGS. 2, 3, 5, and 11, signal $PWM_{M1}$ may be applied to control the gate terminals (G) of MOSFET M1 and M4, signal $PWM_{M2}$ may be applied to control the gate terminals (G) of MOSFETs M2 and M3, signal $PWM_{M7}$ may be applied to control the gate terminal (G) of MOSFETs M5, M7, and M9, and signal $PWM_{M8}$ may be applied to control the gate terminals (G) of MOSFETs M6, M8, and M10.

Signal $PWM_{M1}$ (or one or more substantially identical signals) may control the switches as identified above to be switched (e.g., pulse width modulated), at a switching frequency and based on a duty cycle ratio, during the positive half of a reference signal (equivalent to the sine wave Vout), and control the switches OFF during the negative half of the reference signal. Signal $PWM_{M7}$ may be complimentary (or substantially complimentary) with respect to signal $PWM_{M1}$. For example, signal $PWM_{M7}$ may control the switches as identified above to be switched (e.g., pulse width modulated), at the switching frequency and based on a complementary value of the duty cycle ratio, during the positive half of the reference signal, and control the switches ON during the negative half of the reference signal. Signal $PWM_{M2}$ (or one or more substantially identical signals) may control the switches as identified above to be switched (e.g., pulse width modulated), at the switching frequency and based on the duty cycle ratio, during the negative half of the reference signal, and control the switches OFF during the positive half of the reference signal. Signal $PWM_{M8}$ may be complimentary (or substantially complimentary) with respect to signal $PWM_{M2}$. For example, signal $PWM_{M8}$ may control the switches as identified above to be switched (e.g., pulse width modulated), at the switching frequency and based on a complementary value of the duty cycle ratio, during the negative half of the reference signal, and control the switches to be ON during the positive half of the reference signal. The switching frequency for all of the signals when switched (e.g., pulse width modulated) may be higher than the sine wave frequency of Vout (e.g., 1 Kz—greater than 100 MHz, 16 kHz, 25 kHz, 50 kHz, 100 kHz, 1 MHz, 100 MHz, etc.).

Figure 7:
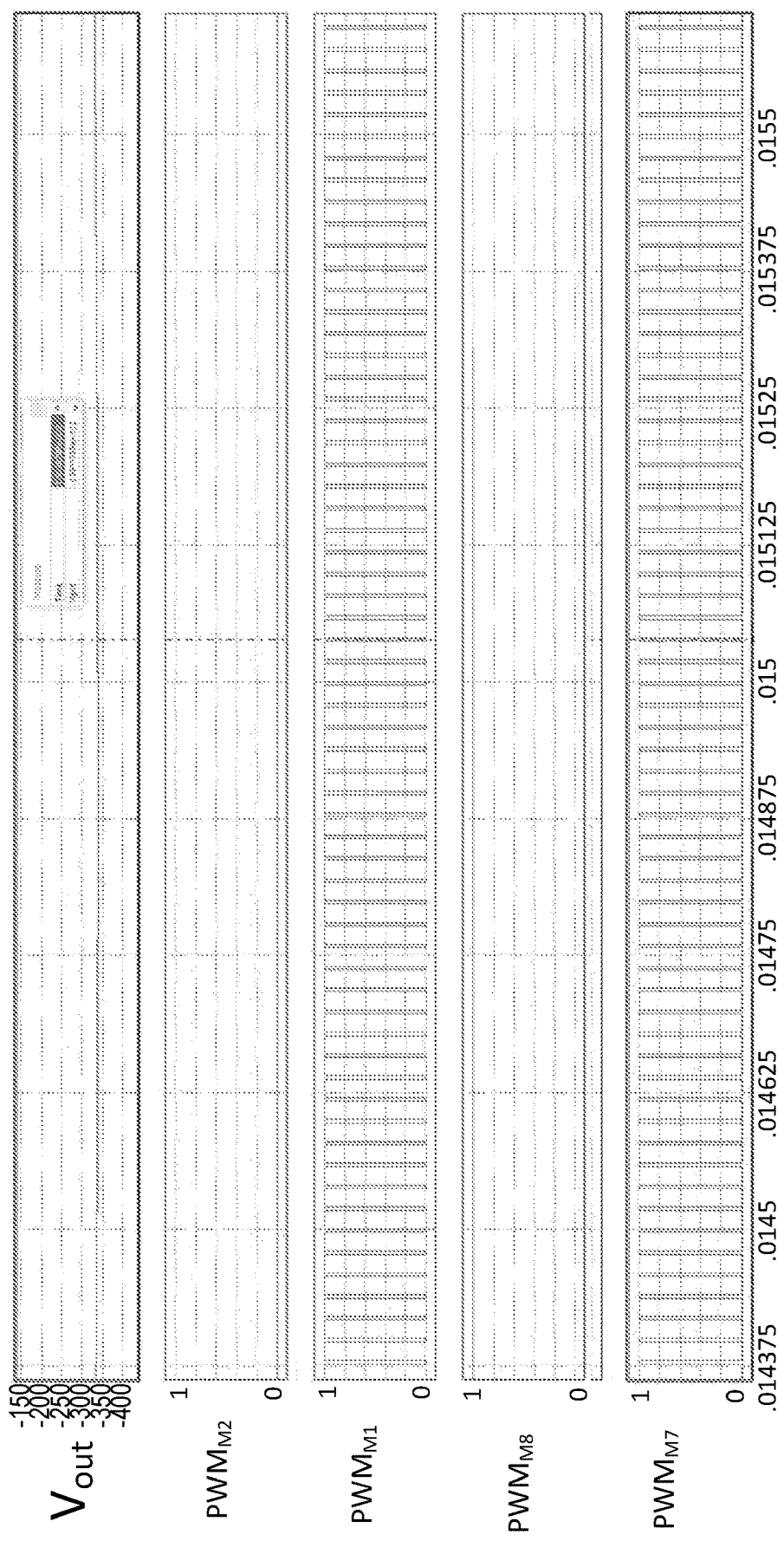

FIG. 7 illustrates example timelines 70, which is a portion of timelines 60 of FIG. 6 around the positive peak of Vout (e.g., 0.025 seconds). As shown in FIG. 7, around the positive peak of Vout, the duty cycle ratio of signal $PWM_{M1}$ may be substantially 95-100%, and thus, the complementary value of the duty cycle ratio of $PWM_{M7}$ may be substantially 0-5%. During this same duration, signal $PWM_{M2}$ may be "0" (e.g., OFF), and signal $PWM_{M8}$ may be "1" (e.g., ON). Equivalently (as described above), $PWM_{A1}$ may have a duty cycle ratio of substantially 95-100%, $PWM_B$ may have a duty cycle ratio of substantially 0-5%, and $PWM_{A2}$ may be "0" (e.g., OFF).

Figure 8:
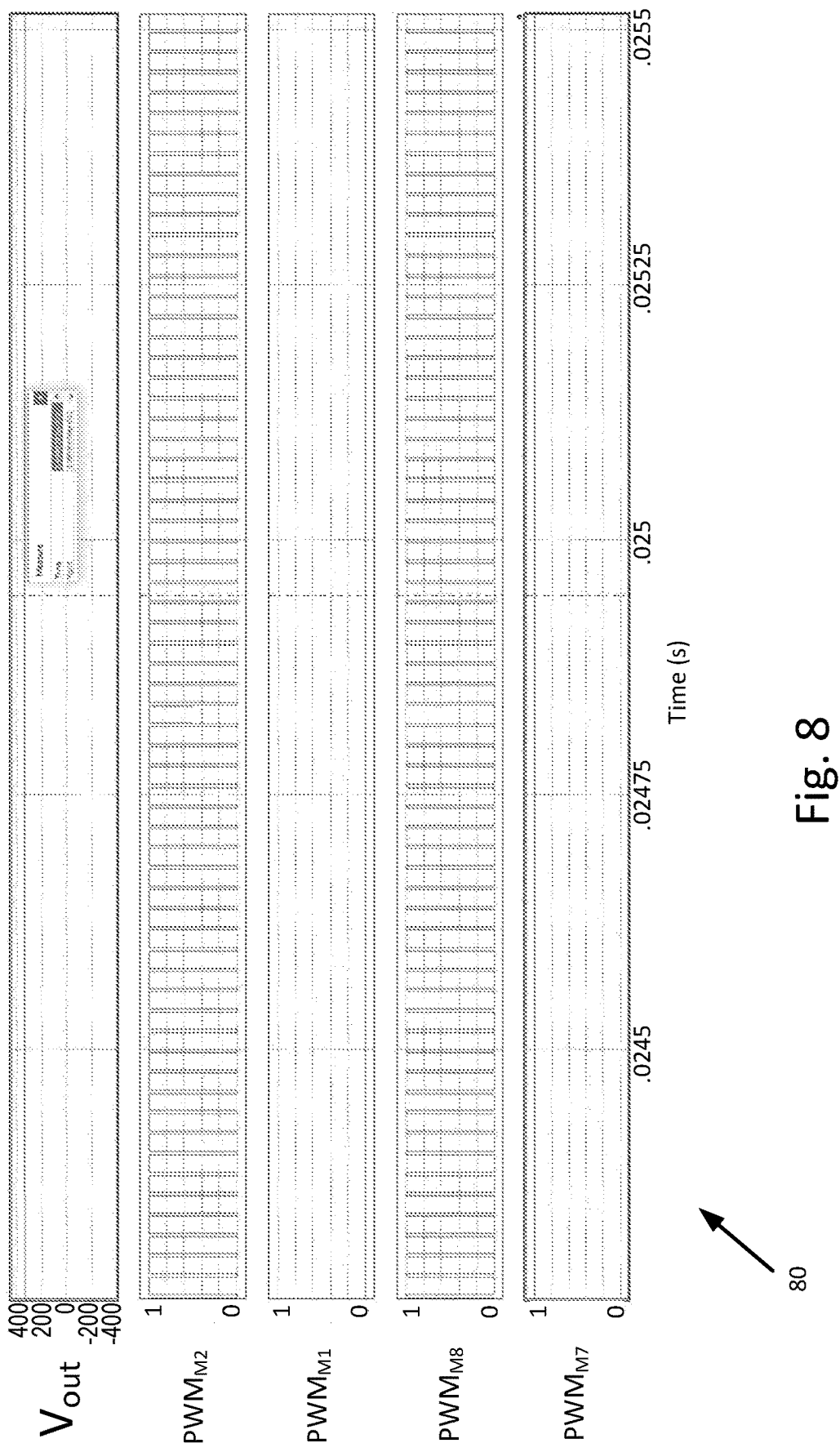

FIG. 8 illustrates example timelines 80, which is a portion of timelines 60 of FIG. 6 around the negative peak of Vout (e.g., 0.015 seconds). As shown in FIG. 8, around the negative peak of Vout, the duty cycle ratio of signal $PWM_{M2}$ may be substantially 95-100%, and thus, the complementary value of the duty cycle ratio of signal $PWM_{M8}$ may be substantially 0-5%. During the same duration, signal $PWM_{M1}$ may be "0" (e.g., OFF), and signal $PWM_{M7}$ may be "1" (e.g., ON).

Figure 9A:
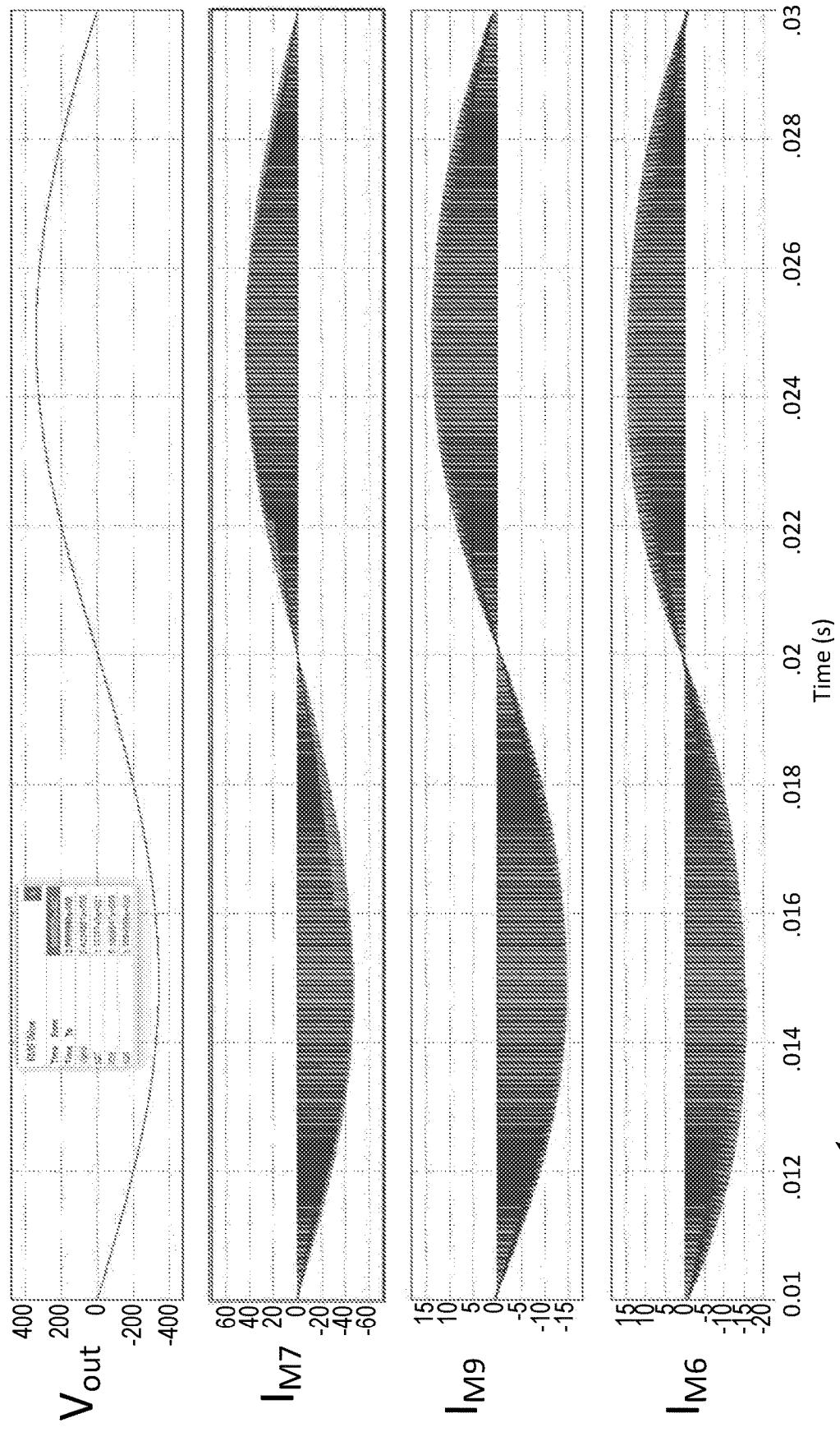
FIGS. 9a-9f illustrate example voltage and current waveforms of the electrical circuits of FIGS. 1-3, 4a-4b, 5a-5b, 10-11 and 14.

FIG. 9a illustrates timelines 90 showing example waveforms of current measurements in a power converter circuit (e.g., power converter circuits 10, 20, 30, 50, 50, 100, or 110) when connected to a split-phase load or system and when a phase imbalance occurs between the first electrical load and the second electrical load connected respectively to each phase of the load/system (e.g., when one of the loads is drawing more power than the other load).

The upper graph shows a waveform, in volts (V) versus time, for output voltage Vout (similar to Vout shown in FIGS. 6-8). Output voltage Vout may be any one of AC output voltages across the output terminals (e.g., across terminals (C) and (N) or across (D) and (N) in FIGS. 1-3, 4a, 4b, 5a, 5b, 10-11, and 14. In the example shown in FIG. 9a, output voltage Vout may be a 50 Hz sine-waveform of $230V_{RMS}$ (though Vout could be other frequencies and voltages such as 60 Hz and $240V_{RMS}$).

Waveforms $I_{M7}$, $I_{M9}$ and $I_{M6}$ represent current measurements through switches of the power converter circuit (e.g., through MOSFETS M7, M9, and M6, respectively). Current measurements $I_{M7}$, $I_{M9}$ and $I_{M6}$ may be taken by digital encoding component(s) (e.g., a microprocessor) and/or analog circuit(s) (e.g., using a sensor, amplifier, an A/D, a comparator, etc.). For example, current measurements $I_{M7}$, $I_{M9}$ and $I_{M6}$ are taken by controllers 80, 180, or 280 via a current transformers or current sensors and analog and digital interface circuitry.

As shown in FIG. 9a, current measurements $I_{M7}$, $I_{M9}$ and $I_{M6}$ have a pattern that repeats at a period of the output voltage Vout (e.g., 20 mS), and within that repeating pattern, the measurements oscillate at the switching frequency with a varying duty cycle (e.g., due the variation of the duty cycle ratio of the switches). In one example, Current measurements $I_{M7}$ may be the current flowing through MOSFET M7 of (e.g., of FIG. 5a). Current measurements $I_{M9}$ may be the current flowing through MOSFET M9 of (e.g., of FIG. 5a). Current measurements $I_{M6}$ may be the current flowing through MOSFET M6 of (e.g., of FIG. 5a). In this example, both pairs of MOSFETs of the sixth circuit are controlled and switched (e.g., both the pair of MOSFETs M7-M8 and the pair of MOSFETs M9-M10.

As described with respect to the circuit diagrams, a phase imbalance may occur such that the load coupled across the (C) and (N) terminals (e.g., across the third capacitor (C13)) draws more power/current than the other load coupled across the (D) and (N) terminals (e.g., across the fourth capacitor (C14)). In such a case, the differential current (the difference between the current drawn by the first electrical load and the current drawn by the second electrical load) may be split, so that some of the differential current flows between L1 and the first terminal (N) through MOSFETs M7-M8 and some of the differential current flows between L1 and the first terminal (N) through M5-M6 and M9-M10. With such phase imbalance, the RMS current that flows between L1 and the first terminal (N) through MOSFETs M7-M8 may be larger than the RMS current that flows through MOSFETs M5-M6 and M9-M10. In the example of FIG. 9a, the RMS current that flows through MOSFET M7 is approximately 11.8 A, while the RMS current that flows through MOSFETs M6 and M9 is approximately 5.1 A.

Figure 9B:
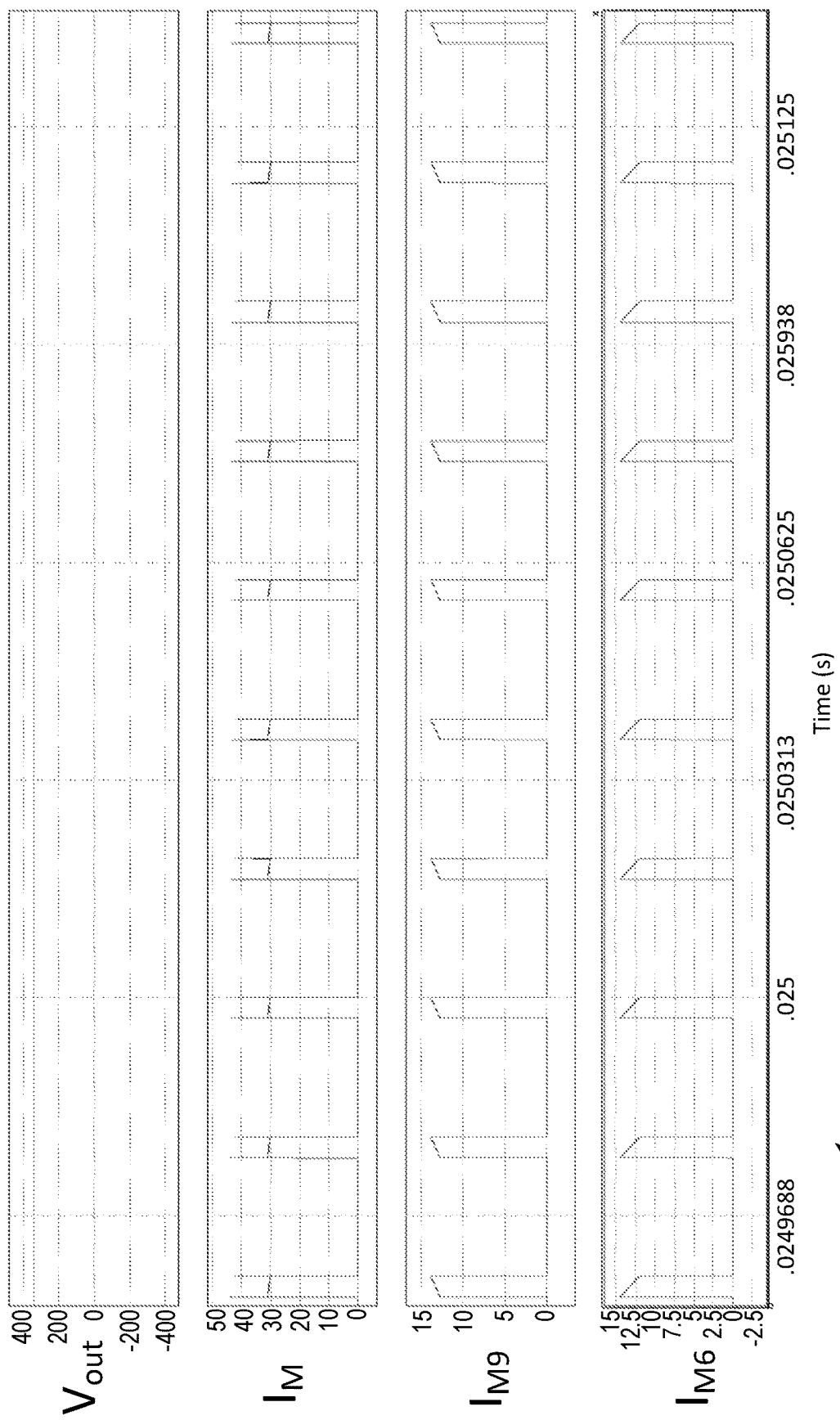

FIG. 9b illustrates example timelines 91, which is a portion of timelines 90 of FIG. 9a around the positive peak of Vout (e.g., 0.025 seconds). As shown in FIG. 9b, around the positive peak of Vout, the duty cycle ratio of the currents flowing in the switches of the power converter circuit (e.g., through MOSFETS M6, M7, and M9) follows the duty cycle ratio of $PWM_{M7}$ in FIG. 7 (e.g., substantially 0-5%) at the same duration around the peak of the Vout signal. When the switches are on, it can be seen that the current through M7 is approximately, 30 A, which is larger in magnitude than the currents through M9 and M6 (about 12 A to 14 A each), resulting from differential current due to the phase imbalance.

Figure 9C:
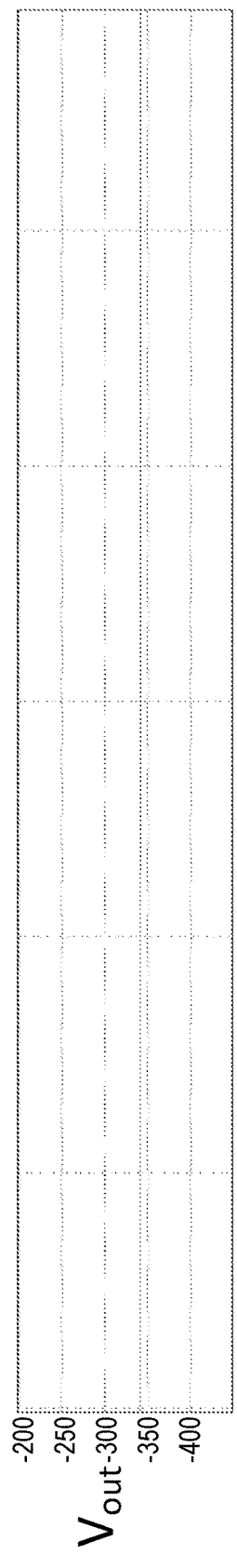
Figure 9C:
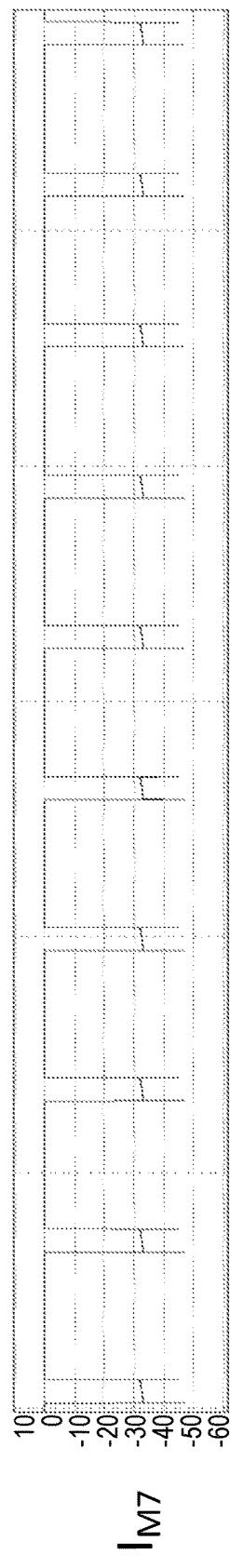
Figure 9C:
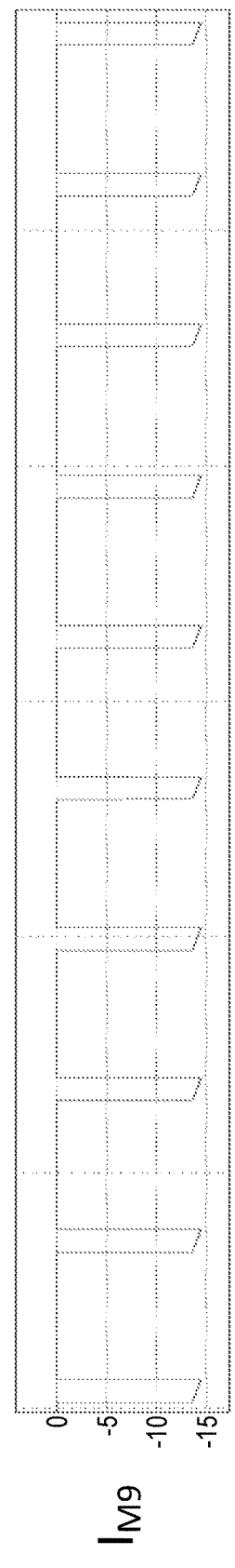
Figure 9C:
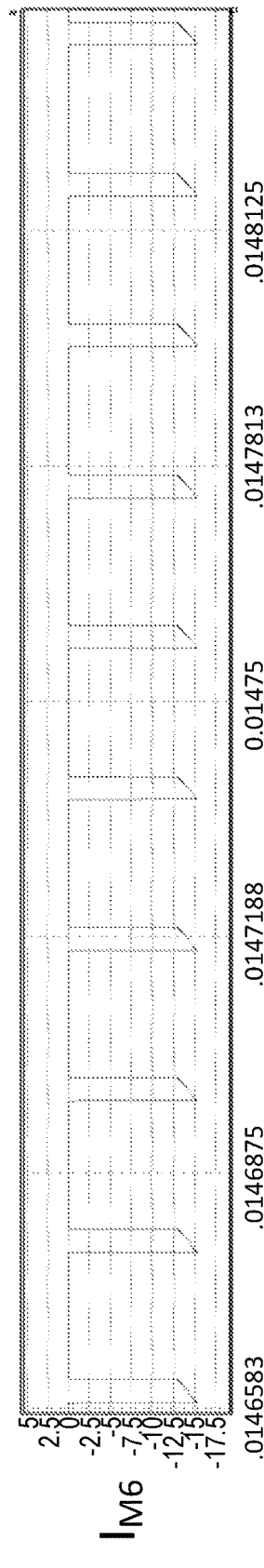

FIG. 9c illustrates example timelines 92, which is a portion of timelines 90 of FIG. 9a around the negative peak of Vout (e.g., about 0.015 seconds). As shown in FIG. 9c, around the negative peak of Vout, the duty cycle ratio of the currents flowing in the switches of the power converter circuit (e.g., through MOSFETS M6, M7, and M9) also follows the duty cycle ratio of $PWM_{M7}$ in FIG. 7 (e.g., substantially 0-5%) at the same duration around the most negative point of the Vout signal. When the switches are on, it can be seen that the current through M7 is approximately, −30 A, which is larger in magnitude than the currents through M9 and M6 (about −12 A to −14 A, each), resulting from differential current due to the phase imbalance.

As described above (e.g., with reference to FIG. 5a), this difference in current is due to a lower resistance of the Kirchhoff's loop (i) via MOSFETs M7-M8 in comparison to loop (ii) via MOSFETs M9-M10 and M5-M6 (drain-source on resistance of two MOSFETs vs four MOSFETs).

The same principle applies in the power converter circuits 10, 20, 30, 40, 45, 50, 55, 100, 110, and 140. For example, in power converter circuits 10, 20, and 30, when the current/power drawn across terminals (C) and (N) is greater than the current/power drawn across terminals (D) and (N), the current through Sb1 and M5-M6 will be greater than the current through Sb2 and M7-M8, and when the current/power drawn across terminals (D) and (N) is greater than the current/power drawn across terminals (C) and (N), the current through Sb2 and M7-M8 will be greater than the current through Sb1 and M5-M6. In power converter circuit 40, when the current/power drawn across terminals (C) and (N) is greater than the current/power drawn across terminals (D) and (N), the current through Sb12 will be greater than the current through Sb11 and Sb13, and when the current/power drawn across terminals (D) and (N) is greater than the current/power drawn across terminals (C) and (N), the current through Sb13 will be greater than the current through Sb11 and Sb12. In the power converter circuits 100 and 110, when the current/power drawn across terminals (C) and (N) is greater than the current/power drawn across terminals (D) and (N), the current through Sb21 and M5 will be greater than the current through Sb22 and M6, and when the current/power drawn across terminals (D) and (N) is greater than the current/power drawn across terminals (C) and (N), the current through Sb22 and M6 will be greater than the current through Sb21 and M5.

Figure 9D:
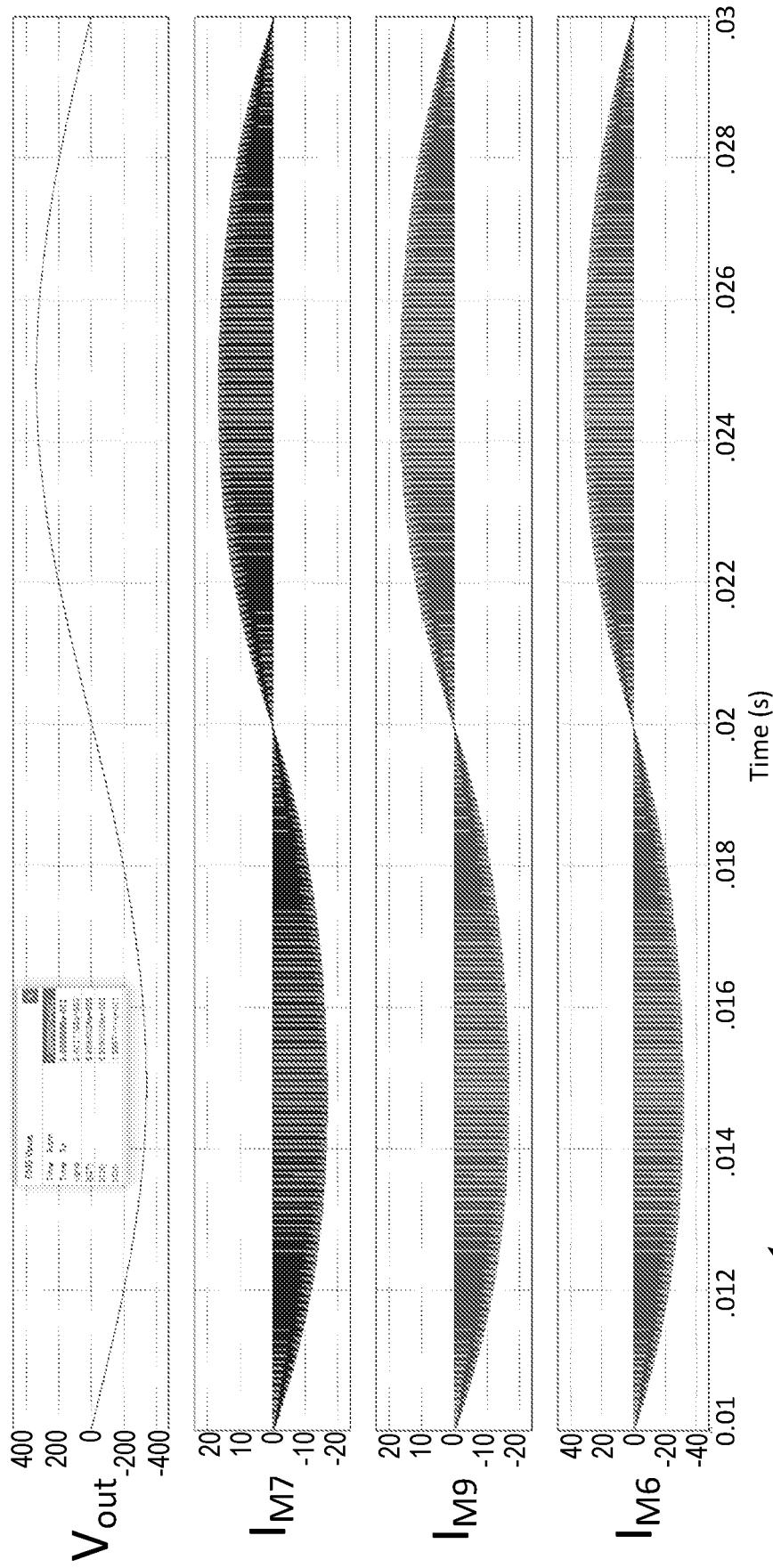

FIG. 9d illustrates timelines 93 showing example waveforms of current measurements in a power converter circuit (e.g., power converter circuits 10, 20, 30, 40, 45, 50, 55, 100, or 110) when connected to a split-phase load or system and when a phase balance occurs between the first electrical load and the second electrical load connected respectively to each phase of the load/system (e.g., when both of the loads are drawing substantially the same power as the other load).

The upper graph shows a waveform, in volts (V) versus time, for output voltage Vout (similar to Vout shown in FIGS. 6-8). Output voltage Vout may be any one of AC output voltages across the output terminals (e.g., across terminals (C) and (N) or across (D) and (N) in FIGS. 1-3, 4a, 4b, 5a, 5b, 10-11, and 14. In the example shown in FIG. 9d, output voltage Vout may be a 50 Hz sine-waveform of $230V_{RMS}$ (though Vout could be other frequencies and voltages such as 60 Hz and $240V_{RMS}$).

Waveforms $I_{M7}$, $I_{M9}$ and $I_{M6}$ represent current measurements through switches of the power converter circuit (e.g., through MOSFETS M7, M9, and M6, respectively). Current measurements $I_{M7}$, $I_{M9}$ and $I_{M6}$ may be taken by digital encoding component(s) (e.g., a microprocessor) and/or analog circuit(s) (e.g., using a sensor, amplifier, an A/D, a comparator, etc.). For example, current measurements $I_{M7}$, $I_{M9}$ and $I_{M6}$ are taken by controllers 80, 180, or 280 via a current transformers or other current sensors and analog and digital interface circuitry.

As shown in FIG. 9d, current measurements $I_{M7}$, $I_{M9}$ and $I_{M6}$ have a pattern that repeats at a period of the output voltage Vout (e.g., 20 mS), and within that repeating pattern, the measurements oscillate at the switching frequency with a varying duty cycle (e.g., due the variation of the duty cycle ratio of the switches). In one example, current measurements $I_{M7}$ may be the current flowing through MOSFET M7 (e.g., of FIG. 5a); current measurements $I_{M9}$ may be the current flowing through MOSFET M9 (e.g., of FIG. 5a); current measurements $I_{M6}$ may be the current flowing through MOSFET M6 (e.g., of FIG. 5a). In that case, both pairs of MOSFETs of the sixth circuit are controlled and switched (e.g., both the pair of MOSFETs M7-M8 and the pair of MOSFETs M9-M10).

As described with respect to the circuit diagrams, a phase balance may occur such that the load coupled across the (C) and (N) terminals (e.g., across the third capacitor (C13)) draws the same power/current as the other load coupled across the (D) and (N) terminals (e.g., across the fourth capacitor (C14)). In such a case, current may be split, so that some of the current flows between L1 and L2 through MOSFETs M5-M6 and some of the current flows between M7-M8 and M9-M10. With such phase balance, the RMS current that flows between L1 and L2 through MOSFETs M5-M6 may be larger than the RMS current that flows through MOSFETs M7-M8 and M9-M10. In the example of FIG. 9d, the RMS current that flows through MOSFET M6 is approximately 11.8 A, while the RMS current that flows through MOSFETs M7 and M9 is approximately 5.1 A.

Figure 9E:
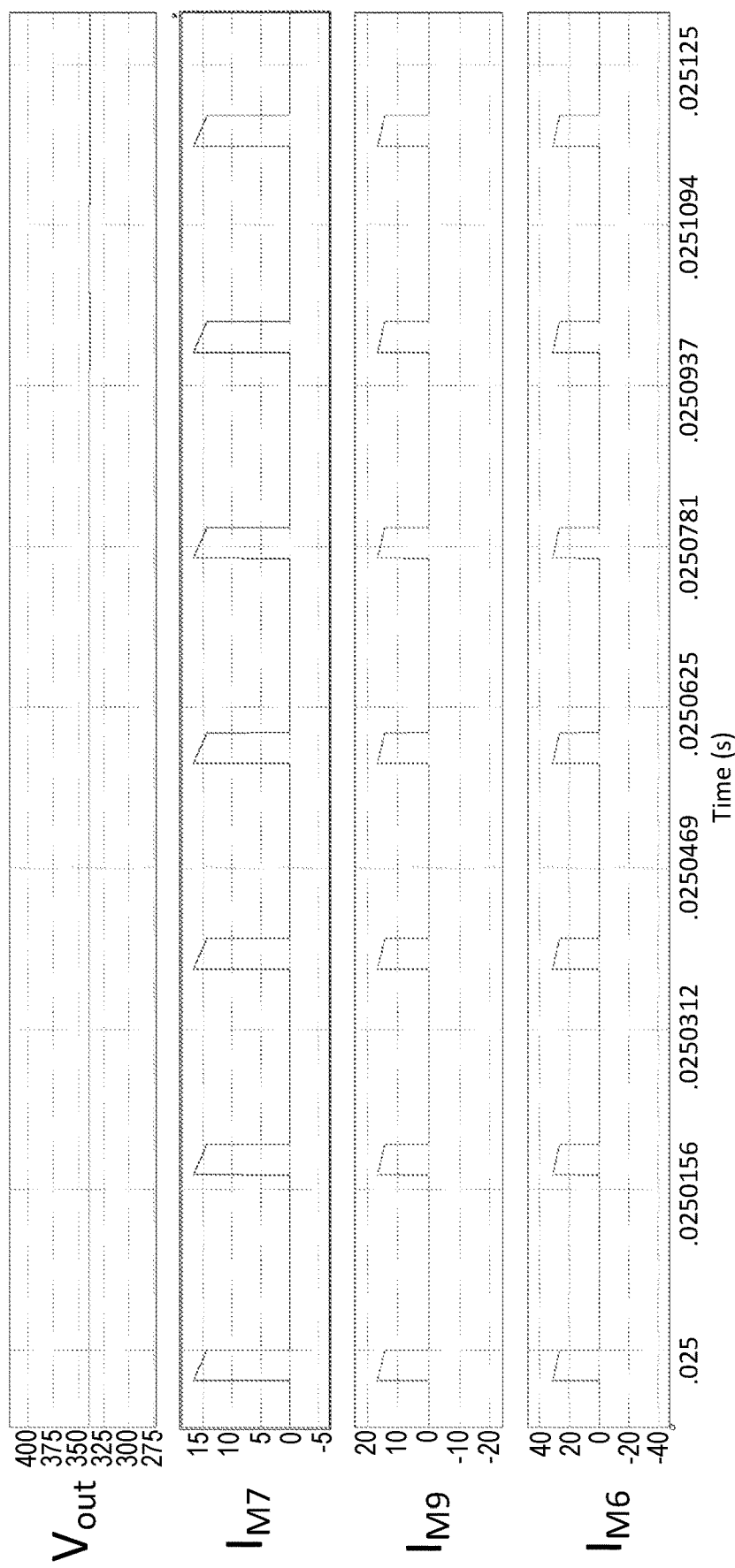

FIG. 9e illustrates example timelines 94, which is a portion of timelines 93 of FIG. 9d around the positive peak of Vout (e.g., 0.025 seconds). As shown in FIG. 9e, around the positive peak of Vout, the duty cycle ratio of the currents flowing in the switches of the power converter circuit (e.g., through MOSFETS M6, M7, and M9) follows the duty cycle ratio of $PWM_{M7}$ in FIG. 7 (e.g., substantially 0-5%) at the same duration around the peak of the Vout signal. When the switches are on, it can be seen that the current through M6 is approximately, 30 A, which is larger in magnitude than the currents through M7 and M9 (about 16 A to 18 A each), resulting from substantially equal current due to the phase balance.

Figure 9F:
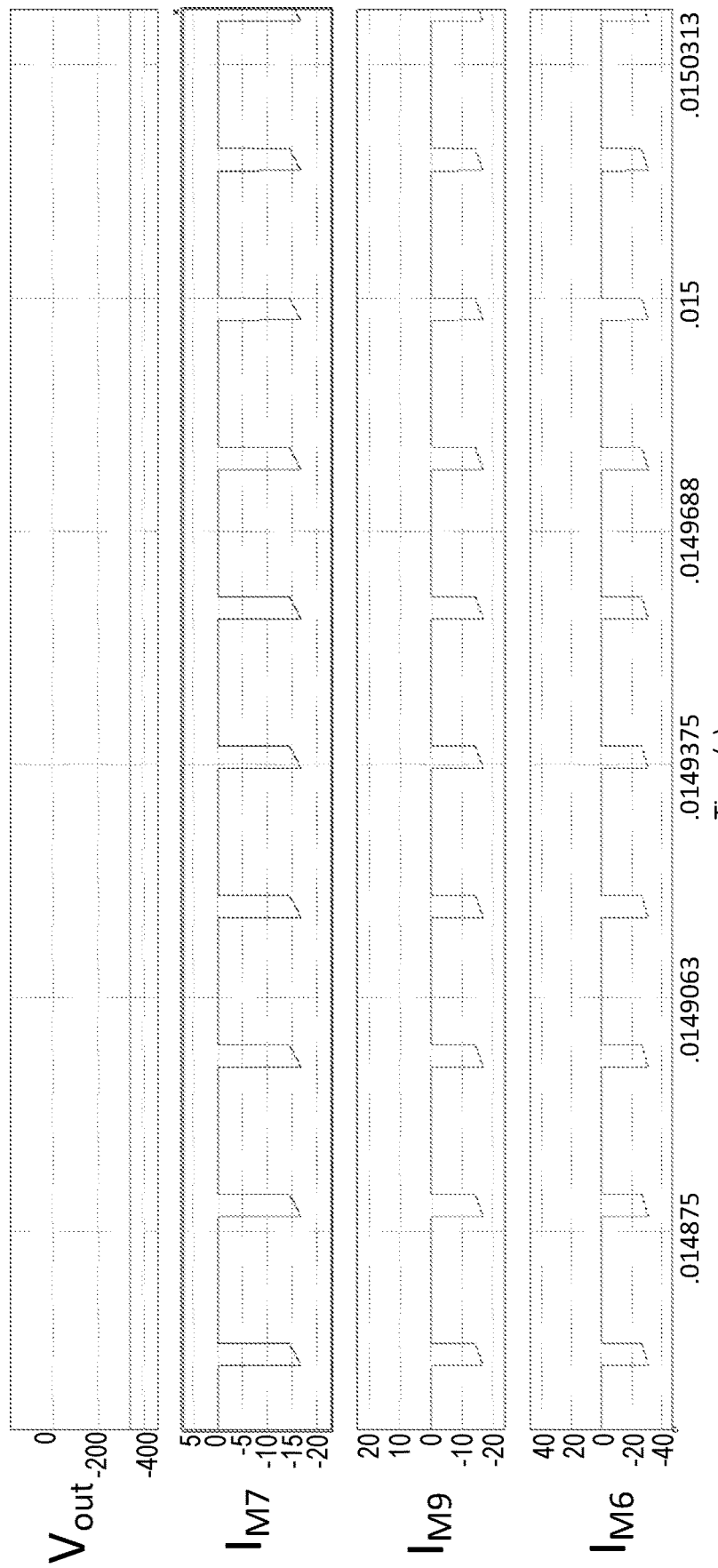

FIG. 9f illustrates example timelines 95, which is a portion of timelines 93 of FIG. 9d around the negative peak of Vout (e.g., about 0.015 seconds). As shown in FIG. 9f, around the negative peak of Vout, the duty cycle ratio of the currents flowing in the switches of the power converter circuit (e.g., through MOSFETS M6, M7, and M9) also follows the duty cycle ratio of $PWM_{M7}$ in FIG. 7 (e.g., substantially 0-5%) at the same duration around the most negative point of the Vout signal. When the switches are on, it can be seen that the current through M6 is approximately, −30 A, which is larger in magnitude than the currents through M9 and M7 (about −16 A to −18 A, each), resulting from substantially equal current due to the phase balance.

As described above (e.g., with reference to FIG. 5a), this difference in current is due to a lower resistance of the Kirchhoff's loop (i) via MOSFETs M5-M6 in comparison to loop (ii) via MOSFETs M7-M8 and M9-M10 (drain-source on resistance of two MOSFETs vs four MOSFETs).

The same principle applies in the power converter circuits 10, 20, 30, 40, 45, 50, 55, 100, 110, and 140. For example, in power converter circuits 10, 20, and 30, when the current/power drawn across terminals (C) and (N) is equal to the current/power drawn across terminals (D) and (N), the current through Sb11 and M5-M6 will be equal to the current through Sb12 and M7-M8. In power converter circuit 40, when the current/power drawn across terminals (C) and (N) is equal to the current/power drawn across terminals (D) and (N), the current through Sb11 will be equal to the current through Sb12 and Sb13. In the power converter circuits 100 and 110, when the current/power drawn across terminals (C) and (N) is equal to the current/power drawn across terminals (D) and (N), the current through Sb21 and M5 will be equal to the current through Sb22 and M6, and greater than the current through Sb23 and M7-M8 will be greater than the current through Sb21 and M5.

Figure 10:
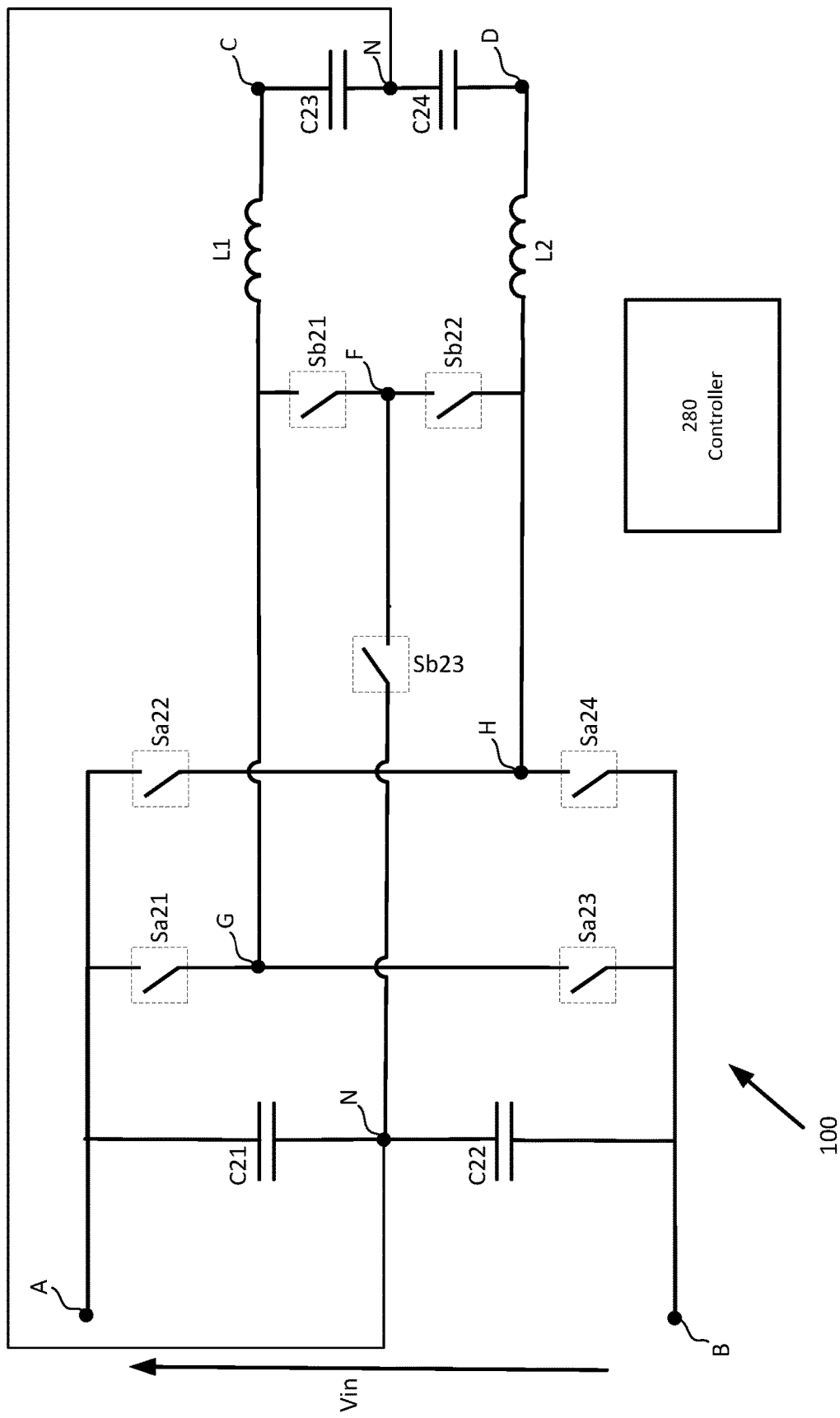
FIGS. 10-11 illustrate diagrams of example electrical circuits.

Reference is now made to FIG. 10, which illustrates a diagram of an example power converter circuit 100 with a transformerless single-phase converter circuit topology. Power converter circuit 100 may be connected to a single-phase or a split-phase (off-grid) load, or to a single-phase or a split-phase electric power distribution system (e.g. grid, distribution board connected to a grid). A direct current (DC) input voltage Vin may be applied across a first input terminal (A) and a second input terminal (B). Input voltage Vin may be a DC voltage received from one or more DC power sources, e.g. a battery, a photovoltaic panel, a rectified source of alternating current (AC) from an AC generator, etc.

A first circuit in power converter circuit 100 may be coupled between input terminals (A) and (B). The first circuit may comprise a first capacitor (C21) coupled between input terminal (A) and a first terminal (N), and a second capacitor (C22) coupled between input terminal (B) and the first terminal (N). Terminal (N) may provide a voltage reference, for example, by being be coupled to at least one of a neutral potential, an earth potential, or a reference terminal, and may be the neutral point of the split-phase output. First Terminal (N) is illustrated at two locations (one near the input and one near the output) which are connected together. While the two locations of first terminal (N) are illustrated with a direct connection, the connection between the two locations may be via one or more intermediate connections, such as earth ground, a frame conductor, etc. Each of the first capacitor (C21) and the second capacitor (C22) may comprise one or more capacitors connected in parallel, connected in series or arranged as a combination of parallel and series connections.

A second circuit in power converter circuit 100 may be connected between input terminals (A) and (B). The second circuit may comprise a first switch (Sa21) coupled between input terminal (A) and a second terminal (G), and a second switch (Sa23) coupled between input terminal (B) and the second terminal (G).

A third circuit in power converter circuit 100 may be coupled between input terminals (A) and (B). The third circuit may comprise a third switch (Sa22) coupled between input terminal (A) and a third terminal (H), and a fourth switch (Sa24) coupled between input terminal (B) and the third terminal (H).

The power converter circuit 100 may further include a first inductor (L1) e coupled between the second terminal (G) and a first output terminal (C), and a second inductor (L2) coupled between the third terminal (H) and a second output terminal (D). In some examples, power converter circuit 100 may include only one of the first inductor (L1) and the second inductor (L2). Power converter circuit 100 may be configured to convert a DC power (having DC input voltage Vin) across to the input terminals (A) and (B) into an AC output power with an AC voltage across the first output terminal (C) and the second output terminal (D). During a pulse duration of the duty cycle, the first inductor (L1) and/or the second inductor (L2) are being charged, and during a complementary period of the pulse duration of the duty cycle (e.g., free-wheeling period), the first inductor (L1) and/or the second inductor (L2) are being discharged.

In some variations, a fourth circuit in power converter circuit 100 may additionally be included and coupled across the first output terminal (C) and the second output terminal (D). The fourth circuit may include a third capacitor (C23) and a fourth capacitor (C24). The third capacitor (C23) may be coupled between the first output terminal (C) the first terminal (N). The fourth capacitor (C24) may be coupled between the first output terminal (D) and the first terminal (N). As illustrated, first terminal (N) includes an intermediate point at the input between the first capacitor (C21) and the second capacitor (C22), and includes an intermediate point at the output between the third capacitor (C23) and the fourth capacitor (C24) (as already described, the intermediate points may be physically separated, but electrically connected).

According to some aspects of the disclosure, a single capacitor or a parallel-connected capacitors may replace the third capacitor (C23) and the fourth capacitor (C24).

As with power converter circuits 10, 20, 30, 40, 45, 50 and 55, the first output terminal (C), the second output terminal (D), and the first terminal (N) may form an interface to a split-phase (off-grid) load or an electrical power distribution system (e.g., grid, distribution board connected to a grid) in which an AC voltage is generated between the first output terminal (C) and the second output terminal (D) as described above.

Different loads may be coupled across terminals (C) and (N) and across (D) and (N) respectively. For example, a first-phase load(s), comprising one or more loads, may be coupled across terminals (C) and (N), and may comprise various components/elements (e.g., inductance, resistance, capacitance). A second-phase load(s), comprising one or more loads, may be coupled across terminals (D) and (N), and may various other components/elements (e.g., inductance, resistance, capacitance). In referring to the first-phase load(s) and second-phase load(s) below, the first-phase load(s) or the second-phase load(s) may include no load, while the other phase has at least one load, which is one example of an imbalance between the phases. In some examples, third capacitor (C23) and fourth capacitor (C24) may represent an equivalent or a total capacitance of the first-phase load(s) across terminals (C) and (N) and the second-phase load(s) across (D) and (N), respectively. Power converter circuit 100 may be configured to provide power (e.g., first and second phase AC power, respectively) to the first-phase load(s) and the second-phase load(s) based on the load characteristics. For example, power converter circuit 100 may provide a first current to the first-phase load(s) connected across terminals (C) and (N) and a second current of different magnitude and/or phase across the second-phase load(s) connected across terminals (D) and (N), based on a determined criterion (e.g., respective load impedances). In another example, power converter circuit 100 may provide a first voltage to the first-phase load(s) and a second voltage of different magnitude and/or phase to the second-phase load(s), based on a determined criterion. Criterion applied for determining the currents may be different than criterion applied for determining voltages.

A fifth circuit in power converter circuit 100 may be coupled across the second terminal (G) and the third terminal (H). The fifth circuit may comprise a fifth switch (Sb21) between the second terminal (G) and a fourth terminal (F), and a sixth switch (Sb22) coupled between the fourth terminal (F) and third terminal (H).

A sixth circuit in power converter circuit 100 may be coupled across between the first terminal (N) and the fourth terminal (F). The sixth circuit may comprise a seventh switch (Sb23) coupled between the first terminal (N) and the fourth terminal (F).

Power converter circuit 100 may additionally comprise a controller 280, for example: a digital signal processing (DSP) circuit, a field programmable gate array (FPGA) device, embedded controller, etc. Controller 280 may be configured to control power converter circuit 100 and its components (for example, switches, voltages, etc.) based on a predetermined algorithm, a measured parameter (e.g., a measurement collected by one or more sensors), a calculated parameter, an estimated parameter (e.g., based on one or more measured parameters), a determined parameter (e.g., based on a combination of algorithm, measure parameter, calculated parameter, and/or estimated parameter), or any other appropriate data. As an example, such parameters may include an electrical parameter, including: current, voltage, power, frequency, etc. In some aspects, controller 280 may comprise or be coupled to sensors configured to measure or sense one or more electrical parameters of power converter circuit 100. Based on the measurement or the sensing of the one or more electrical parameters of power converter circuit 100, controller 280 may determine load characteristics of the first-phase load(s) (e.g., connected between terminals (C) and (N)) and/or the second-phase load(s) (e.g., connected between terminals (D) and (N)), and/or phase imbalance (or balance) of current through or voltage across the first-phase load(s) and the second-phase load(s). Phase imbalance may occur when the power converter circuit 100 (via the first output terminal (C), the second output terminal (D), and the first terminal (N)) forms an interface to a split-phase (off-grid) load or electrical distribution system (e.g., grid, distribution board connected to a grid) in which an AC voltage is generated between the first output terminal (C) and the second output terminal (D).

Controller 280 may be configured to control and switch (turn on and off) one or more switches, including: the first switch (Sa21), the second switch (Sa23), the third switch (Sa22), the fourth switch (Sa24), the fifth switch (Sb21), the sixth switch (Sb22) and the seventh switch (Sb23). Controller 280 may control the one or more switches based on a reference signal (e.g., digital, analog) that comprises a sine wave. A frequency of the sine wave frequency corresponds to an output frequency of AC power output by converter circuit 100.

Additionally or alternatively, controller 280 may use another (e.g., second) reference signal (e.g., a clock signal) to switch the one or more switches, at a switching frequency, based on a duty cycle ratio. The switching frequency may be higher than the sine wave frequency of the reference signal (e.g., 1 kHz to greater than 100 MHz, such as 16 kHz, 25 kHz, 50 kHz, 100 kHz, 1 MHz, 100 MHz, a variable frequency of 16 kHz-100 MHz etc.). The duty cycle ratio may be determined in the same manner as described above with respect to FIG. 1-3, 4a, 4b, 5a, or 5b.

In some examples, one or more switches of: the first switch (Sa21), the second switch (Sa23), the third switch (Sa22), the fourth switch (Sa24), the fifth switch (Sb21) and the sixth switch (Sb22), and the seventh switch (Sb23), may be controlled by another component (e.g., another controller, passive components).

Which of the one or more switches in circuit (100) are switched based on the duty cycle ratio may be based on whether the reference signal is positive or negative (e.g., during positive and negative halves of a sine wave). In some examples, controller 280 may control the first switch (Sa21), in correspondence with (e.g., at the same time and state as) the fourth switch (Sa24), at a switching frequency based on a duty cycle ratio during positive half of the reference signal. During negative half of the reference signal, controller 280 controls the first switch (Sa21) and the fourth switch (4), to be OFF. Controller 280 may control the second switch (Sa23), in correspondence with (e.g., at the same time and state as) the third switch (Sa22), at the switching frequency based on the duty cycle ratio during the negative half of the reference signal, and to be OFF during the positive half of the reference signal.

During positive half of the reference signal, controller 280 may control the fifth switch (Sb21), the sixth switch (Sb22) and the seventh switch (Sb23) substantially (e.g., neglecting dead time, rise and fall time, etc.) in a complementary manner with respect to the first switch (Sa21) and the fourth switch (Sa24). During negative half of the reference signal, controller 280 may control the fifth switch (Sb21), the sixth switch (Sb22) and the seventh switch (Sb23) substantially (e.g., neglecting dead time, rise and fall time, etc.) in a complementary manner with respect to the second switch (Sa23) and the third switch (Sa22).

According to some aspects of the disclosure, controller 280 may control the sixth circuit (e.g., the seventh switch (Sb23)), only based on detecting a phase imbalance between a first-phase load (e.g., connected between terminals (C) and (N)) and a second-phase load (e.g., connected between terminals (D) and (N)). According to some aspects, the sixth circuit may be configured to conduct a difference (e.g., differential current) between the first and the second current through a switched path in power converter circuit 100 via terminal (N).

In some examples, phase imbalance between a first-phase load (e.g., connected between terminals (C) and (N)) and a second-phase load (e.g., connected between terminals (D) and (N)) may occur when one of the loads is drawing more power than the other load. In such a case, the topology of power converter circuit 100 with the control scheme (implemented by controller 280) may control the differential current (the difference between the current drawn by the first-phase load and the current drawn by the second-phase load) to flow through the first terminal (N).

For example, power converter circuit 100 may provide to a first-phase load that is coupled (e.g., connected between terminals (C) and (N)) more power/current than a second-phase load that is coupled (e.g., connected between terminals (D) and (N)) by controlling the fifth switch (Sb21) and the sixth switch (Sb22), and the seventh switch (Sb23) to conduct the differential current to the first terminal (N). In this case, the RMS current that flows through the fifth switch (Sb21) will be larger than the RMS current that flows through the sixth switch (Sb22) to compensate for the differential current. Sb23 may carry the sum of the currents through the fifth (Sb21) and sixth (Sb22) switches.

In another example, power converter circuit 100 may provide to the second-phase load (e.g., connected between terminals (D) and (N)) more power/current than the first-phase load (e.g., connected between terminals (C) and (N)). In this case, the RMS current that flows through the sixth switch (Sb22) will be larger than the RMS current that flows through the fifth switch (Sb21).

Figure 11:
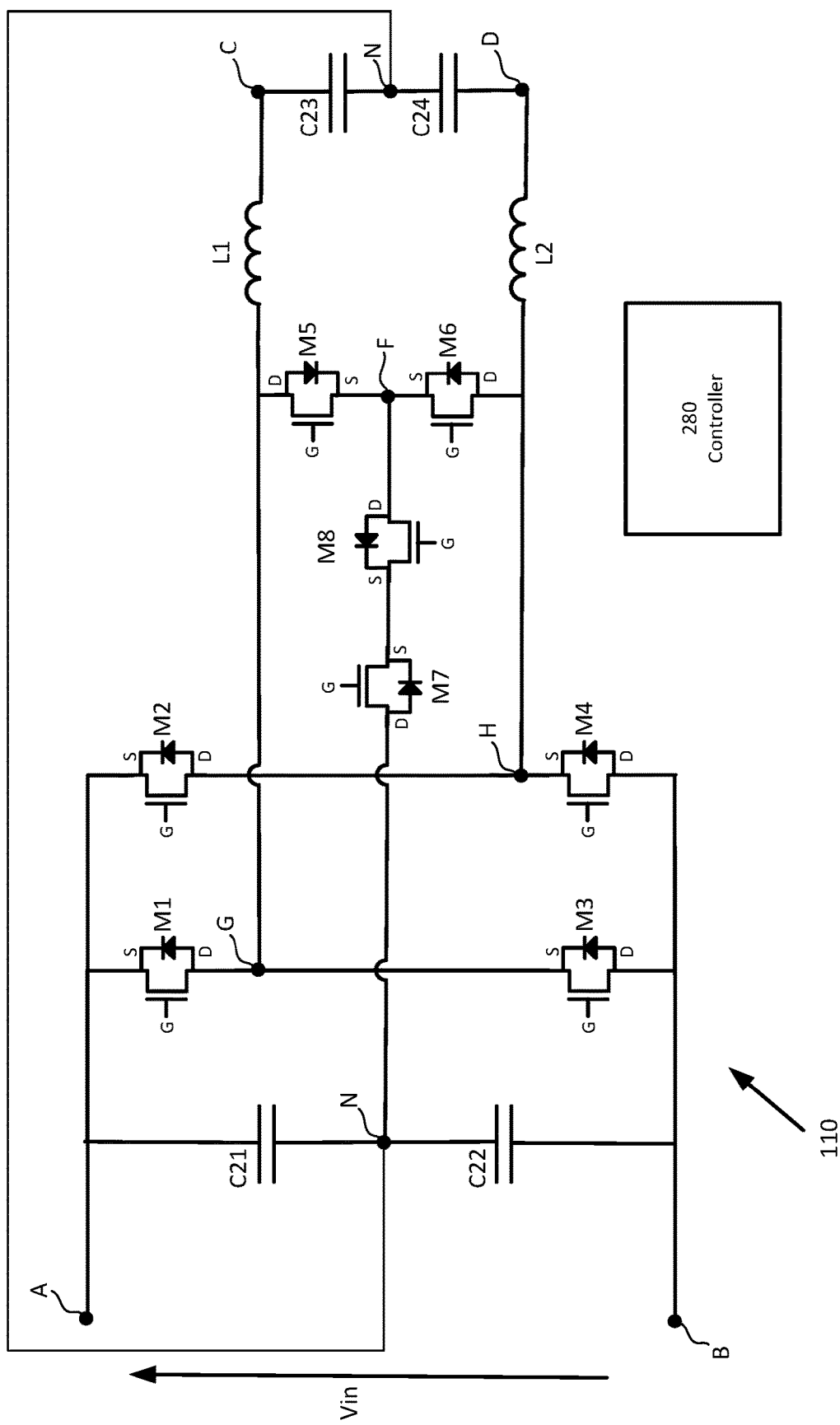

FIG. 11 illustrates a diagram of power converter circuit 110 (e.g., converter), which is an example of power converter circuit 100 of FIG. 10 utilizing transistors for the switches, which may be the same types of transistors, and which may be controlled in the same manner by controller 280, as discussed above with respect to FIGS. 1-5.

In some examples, switches Sa21, Sa22, Sa23, Sa24, Sb21, and Sb22 of FIG. 10 are implemented with MOSFETs. M1, M2, M3, M4, M5, and M6, and switch Sb23 is implemented with MOSFETs M7 and M8. Controller 280 may control each one of MOSFETs M1, M2, M3, M4, M5, M6, M7, and M8.

MOSFETs M1, M2, M3, M4, M5, M6, M7, M8, M9 and M10 may be an n-type enhancement metal-oxide-semiconductor field-effect transistor comprising drain, source and gate terminals (denoted D, S and G respectively). In this example, controller 280 (with associated driver circuits not shown) may control the voltage difference between the source and gate terminals of MOSFETs M1, M2, M3, M4, M5, M6, M7, M8, M9 and M10 to configure each MOSFET into conducting (ON) and non-conducting (OFF) states.

In some examples, switch Sb23 may be implemented by (at least) two series-connected MOSFETs connected in a back-to-back (e.g., source-to-source, drain-to-drain) configuration such that body diodes in the MOSFETS (or external diodes connected across the MOSFET S and D terminals) are oriented in opposite directions (e.g., anode-to-anode or cathode-to-cathode). This back-to-back configuration prevents current from flowing through the diodes when both MOSFETs are OFF and, in some cases, enables switching only a single MOSFET to enable the current flowing. For example, the anode of the body diode of MOSFET M8 may be coupled with the fourth terminal (F), the cathode of the body diode of MOSFET M5 may be coupled with the cathode of the body diode of MOSFET M7, and the anode of the body diode of MOSFET M7 may be coupled with the third terminal (H). The anode of the body diode of MOSFET M8 may be coupled with the first terminal (N).

Controller 280 may be configured to determine a switching frequency and duty cycle ratio for the switches (e.g., in FIG. 11) and control the switches according to those parameters in the same manner as described above with respect to FIG. 10. For example, controller 280 may be configured to control switches M1, M2, M3, M4, M5, and M6 in the same states as Sa1, Sa2, Sa3, Sa4, Sb1, and Sb2, respectively.

Controller 280 may further be configured to control the pair of MOSFETs M7-M8 to collectively conduct (be ON) and not to conduct (be OFF) in the same manner as Sb23 (e.g., at the switching frequency and duty cycle ratio of Sb23). For example, controller 280 may control both M7 and M8 together (e.g., both ON or both OFF) according to the same pattern as Sb23 as described above with respect to FIG. 10 (e.g., substantially complementary to the state of Sa1 or M1 during a positive half-cycles and substantially complementary to Sa2 or M2 during negative half-cycles). In another example, controller 280 may control a first MOSFET (e.g., MOSFET M8 or M7) of the pair of MOSFETs in the same states as Sb23 (e.g., substantially complementary to the state of Sa1 or M1) during each first half cycle (e.g., positive half) of the sine wave period while maintaining the second MOSFET (e.g., MOSFET M7 or M8) of the pair of MOSFETS ON throughout the first half cycle. During each second half cycle (e.g., negative half) of the sine wave period, controller 280 may control the second MOSFET (e.g., MOSFET M7 or M8) of the pair of MOSFETS in the same states as Sb23 (e.g., substantially complementary to the state of Sa2 or M2), while maintaining the first MOSFET (e.g., MOSFET M8 or M7) ON throughout the second half cycle. This control scheme may reduce switching losses and mean time between failures (MTBF) of the MOSFETs.

Controller 280 may sense the load power consumption of the first-phase load(s) and the second-phase load(s). In some examples, based on detecting a balanced load power consumption of the first-phase load(s) and the second-phase load(s), controller 280 may maintain OFF (e.g., non-conducting) the MOSFETs M7-M8 of the sixth circuit. Thereby, switching losses of power converter circuit 40 are reduced.

According to some aspects of the disclosure, phase imbalance between the first electrical load (e.g., connected between terminals (C) and (N)) and the second electrical load e.g., connected between terminals (D) and (N)) may occur when one of the loads is drawing more power than the other load. In such a case, the topology of power converter circuit 110 with the control scheme (implemented by controller 280) may control the differential current (the difference between the current drawn by the first-phase load and the current drawn by the second-phase load) to flow through a switched path via the first terminal (N).

For example, power converter circuit 110 may provide to a first-phase load that is coupled (e.g., connected between terminals (C) and (N)) more power/current than a second-phase load that is coupled (e.g., connected between terminals (D) and (N)) by controlling MOSFETs M5, M6, and M7-M8 to conduct the differential current to the first terminal (N). In this case, the RMS current that flows through MOSFET M5 will be larger than the RMS current that flows through MOSFET M6 to compensate for the differential current. In another example, the second-phase load (e.g., connected between terminals (D) and (N)) may draw more power/current than the first-phase load (e.g., connected between terminals (C) and (N)). In this case, the RMS current that flows through the seventh switch MOSFET M6 will be larger than the RMS current that flows through MOSFET M5.

The impedance ratio between the impedance of MOSFETs M5 and M6, and the impedance of MOSFETs M7 and M8 affects the current division among the switches. For example, if the first-phase load and the second-phase load are phase balanced (or substantially phase balanced) by drawing equal current (or substantially equal current), some amount of current will flow only through MOSFETs M5 and M6 and some amount of current will flow through to the first terminal (N) and MOSFETs M7 and M8 (and at least one of MOSFETs M5 and M6), due to the impedance ratio.

Figure 12:
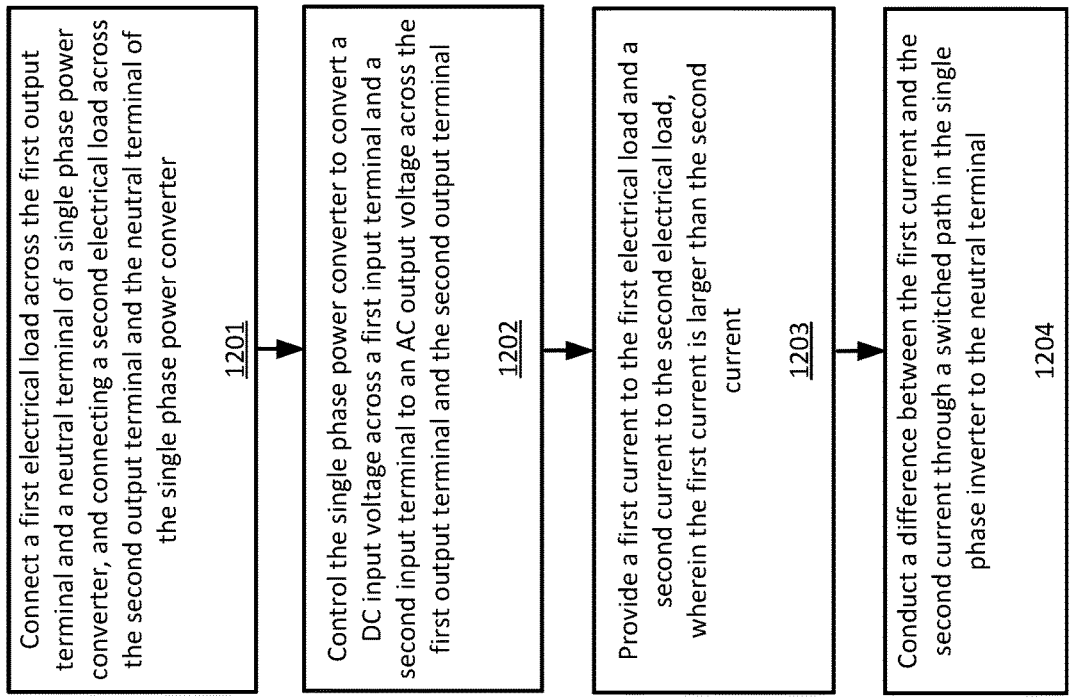

Reference is now made to FIG. 12, which illustrates an example method 1200 for controlling a single-phase power converter circuit. In some aspects of the disclosure, the single-phase power converter circuit may be coupled to a split-phase electric power distribution system.

Method 1200 for controlling a single-phase power converter circuit may be applied to a single-phase power converter circuit that may be configured to convert a direct current (DC) input voltage across a first input terminal and a second input terminal to an alternating current output voltage at an output frequency across a first output terminal and a second output terminal. The single-phase power converter circuit may comprise a first capacitor connected across the first input terminal and a neutral terminal, and a second capacitor connected across the second input terminal and the neutral terminal. The single-phase power converter circuit may be coupled to a third capacitor connected across the first output terminal and the neutral terminal, and a fourth capacitor connected across the second output terminal and the neutral terminal. The neutral terminal between the first and second capacitors may be the same as the neutral terminal between the third and the fourth capacitors.

As an example, the single-phase power converter circuit can be power converter circuit 10, power converter circuit 20, power converter circuit 30, power converter circuit 40, power converter circuit 45, power converter circuit 50, power converter circuit 55, power converter circuit 100, power converter circuit 110, and power converter circuit 140, of FIGS. 1, 2, 3, 4a, 4b, 5, 5b, 10, 11, and 14 respectively. Method 1200 may be performed by a controller circuit (e.g., controllers 80, 180, 280 of FIGS. 1-3, 4a-4b, 5a-5b, 10-11, and 14), for example: a digital signal processing (DSP) circuit, a field programmable gate array (FPGA) device, embedded controller, etc. The controller may control the power converter circuit and its components (for example, switches, voltages, etc.) based on a predetermined algorithm, a measured parameter (e.g., a measurement collected by one or more sensors), a calculated parameter, an estimated parameter (e.g., based on one or more measured parameters), a determined parameter (e.g., based on a combination of an algorithm, measure parameter, calculated parameter, and/or estimated parameter) or any other appropriate data. As an example, such parameter may include an electrical parameter including: current, voltage, power, frequency, etc. In some aspects, the controller may comprise or be coupled to sensors to measure or sense one or more electrical parameters of power converter circuit. Method 1200 may be performed by the controller controlling the switches of the power converter circuits 10, 20, 30, 40, 45, 50, 55, 100, 110, and 140 as described above.

Step 1201 comprises connecting a first electrical load (which may comprise one or more loads) across a first output terminal and a neutral terminal of a single-phase power converter, and connecting a second electrical load (which may comprise one or more loads) across a second output terminal and the neutral terminal of the single-phase power converter. A previously discussed, the loads may not be balanced such that the impedances of the loads may be different.

Step 1202 includes controlling (e.g., with controller 80, 180, or 280) the single-phase converter to convert a direct current (DC) input voltage across a first input terminal and a second input terminal to an alternating current (AC) output voltage across a first output terminal and a second output terminal.

Step 1203 comprises controlling (e.g., with controller 80, 180, or 280) the power converter switches to provide a first current to a first electrical load coupled across the first output terminal and a neutral terminal (e.g., capacitor C3, C13, and C23) of any of the circuits described herein), and providing a second current to a second electrical load coupled across the second output terminal and the neutral terminal (e.g., capacitor C4, C14, and C24 of any of the circuits described herein). In some cases, as described in reference to FIGS. 1, 2, 3, 4*a*-4*b*, 5*a*-5*b*, 10, 11, and 14, the first current may be larger than the second current due to the loads not being balanced.

Step 1204 comprises controlling (e.g., with controller 80, 180, or 280) the power converter to conduct a difference between the first and the second current through a switched path in the single-phase inverter via the neutral terminal. This may include the controller configuring the power converter circuit with at least two different current loops, a first current loop across the first-phase load (e.g., from terminal (C) to terminal (N)) to conduct a first current from a first capacitor coupled across the first input terminal and the neutral terminal, and a second current loop across the second-phase load (e.g., from terminal (D) to terminal (N)) to conduct a second current from the second capacitor across the second input terminal and the neutral terminal.

Figure 13:
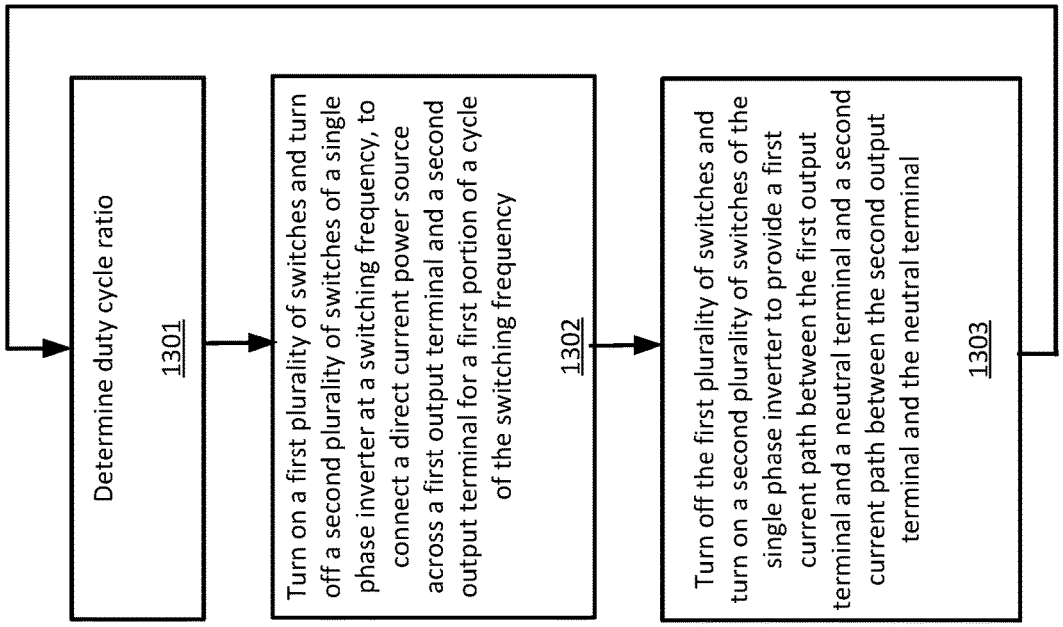
FIGS. 12-13 illustrate example steps of operating a power converter.

As previously explained, during power conversion and conducting of the differential current to the loads connected to the output of the single-phase converter, certain switches are switched at a switching frequency and with a particular duty cycle. FIG. 13 illustrates an example method 1300 for controlling the switches of the single-phase power converter during each modulation (On-Off cycle) at the switching frequency). The switching frequency may be higher than the sine wave frequency of the reference signal (e.g., 1 kHz to greater than 100 MHz, 16 kHz, 25 kHz, 50 kHz, 100 kHz, 1 MHz, 100 MHz, 16 kHz-100 MHz, 100 MHz, etc.). In some examples, the switching frequency may be similar to the sine wave frequency of the reference signal (e.g., 50 Hz, 60 Hz, 500 Hz, etc.)

In step 1301, a controller (e.g., controller 80, 180, or 280) may determine a duty cycle ratio for the current cycle as previously described. For example, the duty cycle ratio may be determined as one of a sequence of duty cycle ratios with average values (e.g., the ON time divided by the total time of the cycle) that form a predetermined waveform (e.g., a sequence of voltages that form a sine wave) to be generated at the outputs of the single-phase power converter. The sequence of duty cycles may form a repeating pattern having a frequency (e.g., 50 Hz, 60 Hz) that is the frequency of the predetermined waveform, and which may be determined as the switching frequency divided by the number of duty cycles in the sequence of duty cycles forming the repeating pattern.

In step 1302, the controller (e.g., controller 80, 180, or 280) may control, for a first duration, turning on a first plurality of switches (e.g., Sa1, Sa4, Sa11, 4, Sa21, Sa24, M1 and M4) or a second plurality of switches (e.g., Sa2, Sa3, 2, 3, Sa22, Sa23, M2 and M3) of the single-phase converter, and turning off a third plurality of switches (e.g., Sb1, Sb2, Sb2, Sb11, Sb12, Sb13, Sb21, Sb22, Sb23, M5-M6, M7-M8 and M9-M10 of FIGS. 1-3, 4*a*, 4*b*, 5*a*, 5*b*, 10-11, 14) to connect a direct current power source across first and second output terminals of the single-phase power converter. The first duration may be about equal to the switching cycle time multiplied by the duty cycle ratio.

For example, the direct current power source may be connected across first and second input terminals (e.g., terminals (A) and (B)) of the single-phase power converter, and the switches that are turned on may connect the first and the second input terminals respectively to the first and the second output terminals, or respectively to the second and the first output terminals.

In step 1302, the controller may select between turning on the first plurality of switches and the second plurality of switches based on the modulation technique, For example the controller may turn on the first plurality of switches for every iteration in the first half of the sequence of duty cycles (e.g., to form the first half of the output sine wave), and turn on the second plurality of switches for every iteration in the second half of the sequence of duty cycles (e.g., to form the second half of the output sine wave). For another modulation technique, in step 1302, the controller may alternate in every iteration of the step between turning on the first plurality of switches and the second plurality of switches.

Step 1302 may further include connecting the direct current power source to the first and the second output terminals through one or more inductors (e.g., connecting L1 between a first output terminal (C) and either the first or the second input terminal) and connecting L2 between a second output terminal (D) and either the first or the second input terminal).

Step 1302 may also include forming, with the first plurality of switches that are turned on, two current loops—a first current loop that passes through a first load (or first output capacitor) connected across the first output terminal and a neutral terminal (e.g., terminals (C) and (N)), and a second current loop that passes through a second load (or second output capacitor) connected across the second output terminal and the neutral terminal (e.g., terminals (D) and (N)). The two current loops may allow different levels of current to flow through respective loads that are not balanced. The two current loops may further pass through two input capacitors—a first input capacitor connected between the first input terminal and the neutral terminal (e.g., terminals (A) and (N)), and a second input capacitor connected between the second input terminal and the neutral terminal (e.g., terminals (B) and (N)).

In step 1303 the controller (e.g., controller 80, 180, or 280) may control, for a second duration, turning off the first plurality of switches or the second plurality of switches (whichever was turned on in the previous step 1302), and turning on the third plurality of switches (e.g., Sb1, Sb2 of FIG. 1, Sb11, Sb12, Sb13 of FIG. 4a, Sb21, Sb22, Sb23 of FIG. 10, MOSFETs M5-M6 and M7-M8 of FIG. 11, MOSFETs M5-M6, M7-M8 and M9-M10 of FIG. 5a, MOSFETs M5-M6 and M7-M8 of FIG. 11) of the single-phase converter to connect the first output terminal (e.g., terminal (C)) to the second output terminal (e.g., terminal (D)). This switching may further disconnect the first and the second output terminals from the first input terminal, the second input terminal, or both the first and the second input terminals. The second duration is the remainder of the switching cycle, which may be about equal to switching cycle time multiplied by one minus the duty cycle ratio. The first duration and the second duration together form the period of the switching frequency as described in reference to FIGS. 1, 2, 3, 4a, 4b, 5a, 5b, 10, 11 and 14. According to some aspects of the disclosure and as described in reference to FIGS. 4a, 4b, 5a, 5b, 10, 11 and 14, the controller (e.g., controller 80, 180, or 280) may maintain OFF (e.g., not turn ON) one or more switches of the third plurality of switches also during the second duration. Thereby, reducing switching losses of power converter circuit.

Step 1303 may further include connecting the first output terminal (e.g., terminal (C)) to the second output terminal (e.g., terminal (D)) through the one or more inductors (e.g., connecting L1 and L2 end-to-end between the first output terminal (C) and the second output terminal (D)).

Step 1303 may also include forming, with the third plurality of switches that are turned on, two current loops—a third current loop that passes through the first load (or first output capacitor) connected across the first output terminal and a neutral terminal (e.g., terminals (C) and (N)), and a fourth current loop that passes through the second load (or second output capacitor) connected across the second output terminal and the neutral terminal (e.g., terminals (D) and (N)). The third and fourth current loops may discharge the voltage across the first and the second loads with different levels of current resulting from an imbalance between the loads. The third current loop may include the first inductor (e.g., L1) and fourth current loop may include the second inductor (e.g., L2).

Method 1300 may repeat with each iteration using the next duty cycle in the sequence of duty cycles that determine the shape (e.g., voltage) of the waveform output by the single-phase converter.

Figure 14:
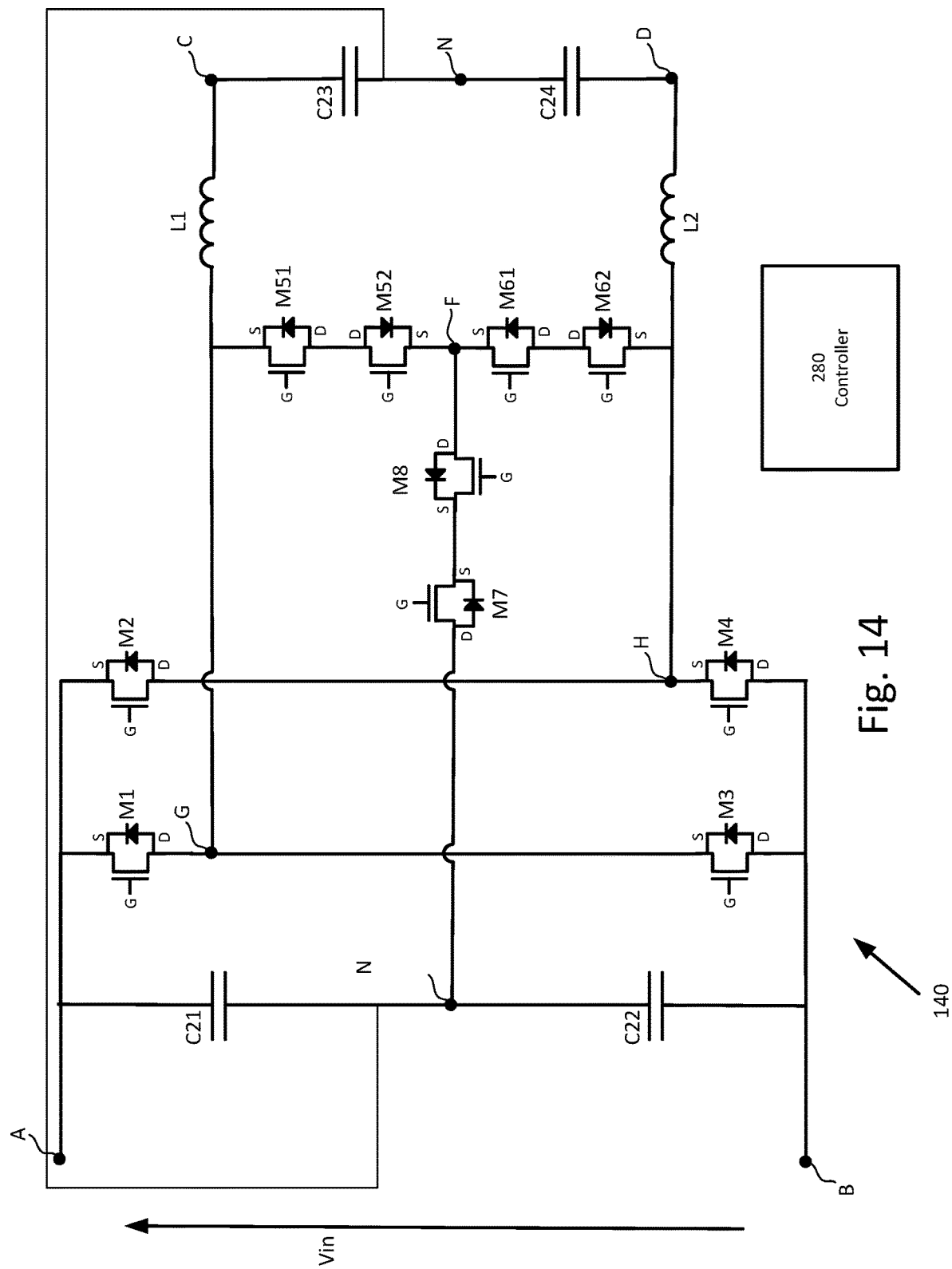
FIG. 14 illustrates a diagram of example electrical circuits.

FIG. 14 illustrates a diagram of power converter circuit 140 (e.g., inverter, rectifier), which is an example of power converter circuit 110 of FIG. 11 utilizing back-to-back MOSFETs for the MOSFETs of the fifth circuit of FIG. 11 (and 10). The back-to-back MOSFETs may be the same types of transistors, and which may be controlled in the same manner by controller 280, as discussed above with respect to FIG. 11.

In some examples, each of switches M5 and M6 of FIG. 11 may be implemented by (at least) two series-connected MOSFETs connected in a back-to-back (e.g., source-to-source, drain-to-drain) configuration such that body diodes in the MOSFETS (or external diodes connected across the MOSFET S and D terminals) are oriented in opposite directions (e.g., anode-to-anode or cathode-to-cathode). This back-to-back configuration prevents current from flowing through the diodes when both MOSFETs are OFF and, in some cases, enables switching only a single MOSFET to enable the current flowing.

In FIG. 14, MOSFETs M5 and M6 of FIG. 11 are implemented with two series-connected MOSFETs connected in a back-to-back configuration. MOSFET M5 of FIG. 11 is implemented with MOSFETs M51 and M52 of FIG. 14, and MOSFET M6 of FIG. 11 is implemented with MOSFETs M61 and M62 of FIG. 14. Controller 180 may control each one of MOSFETs M51, M52, M61 and M62.

Controller 280 may be configured to determine a switching frequency and duty cycle ratio for the MOSFETs (e.g., in FIG. 14) and control the switches according to those parameters in the same manner as described above with respect to FIGS. 10, and 11. For example, controller 280 may be configured to control MOSFETs M51 and M52, and M61 and M62, in the same states as MOSFETs M5 and M6 of FIG. 11, respectively.

Figure 15:
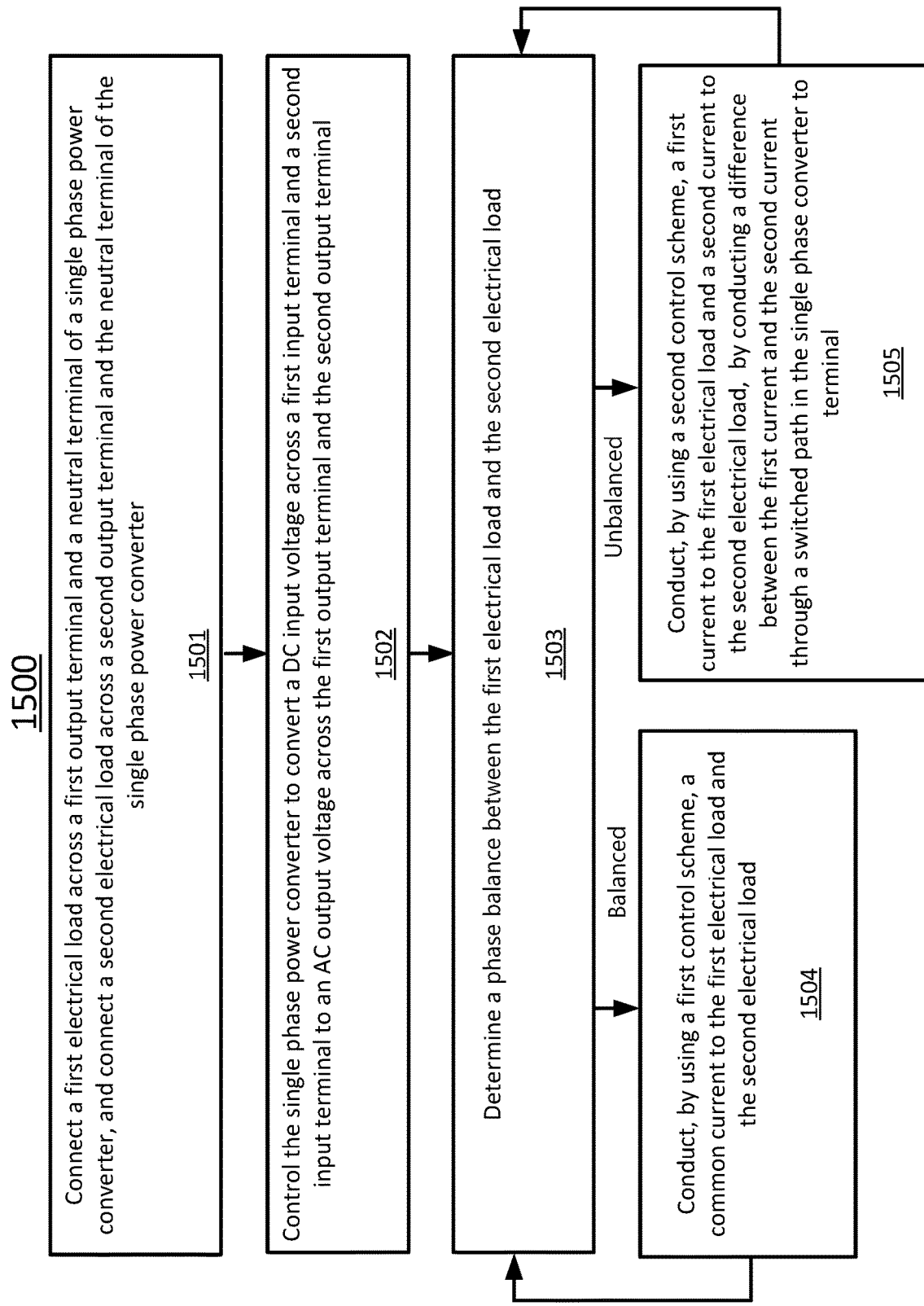
FIG. 15 illustrates example steps of operating a power converter.

Reference is now made to FIG. 15, which illustrates an example method 1500 for controlling a single-phase power converter circuit. The steps of method 1500 may be performed in any order and certain steps may be omitted. The steps of method 1500 may be combined or performed together with some or all of the steps of method 1200 and/or method 1300. In some aspects of the disclosure, the single-phase power converter circuit may be coupled to a split-phase (off-grid) load or split-phase electric power distribution system (e.g., grid, distribution board connected to a grid). Method 1500 for controlling a single-phase power converter circuit may be applied to a single-phase power converter circuit that may be configured to convert a direct current (DC) input voltage across a first input terminal and a second input terminal to an alternating current output voltage at an output frequency across a first output terminal and a second output terminal. The single-phase power converter circuit may comprise a first capacitor connected across the first input terminal and a neutral terminal, and a second capacitor connected across the second input terminal and the neutral terminal. The single-phase power converter circuit may be coupled to a third capacitor connected across the first output terminal and the neutral terminal, and a fourth capacitor connected across the second output terminal and the neutral terminal. The neutral terminal between the first and second capacitors may be the same as the neutral terminal between the third and the fourth capacitors.

As an example, the single-phase power converter circuit can be power converter circuit 10, power converter circuit 20, power converter circuit 30, power converter circuit 40, power converter circuit 45, power converter circuit 50, power converter circuit 55, power converter circuit 100, power converter circuit 110, and power converter circuit 140, of FIGS. 1, 2, 3, 4a, 4b, 5, 5b, 10, 11, and 14. Method 1500 may be performed by a controller circuit (e.g., controllers 80, 180, 280 of FIGS. 1-3, 4a-4b, 5a-5b, 10-11, 14), for example: a digital signal processing (DSP) circuit, a field programmable gate array (FPGA) device, embedded processor, etc. The controller may control the power converter circuit and its components (for example, switches, voltages, etc.) based on a predetermined algorithm, a measured parameter (e.g., a measurement collected by one or more sensors), a calculated parameter, an estimated parameter (e.g., based on one or more measured parameters), a determined parameter (e.g., based on a combination of algorithm, measure parameter, calculated parameter, and/or estimated parameter) or any other appropriate data. As an example, such parameters may include an electrical parameter, including: current, voltage, power, frequency, etc. In some aspects, the controller may comprise or be coupled to sensors to measure or sense one or more electrical parameters of power converter circuit. Method 1500 may be performed by the controller circuit controlling the switches of the power converter circuits 10, 20, 30, 40, 45, 50, 55, 100, 110, and 140 as described above.

Step 1501 comprises connecting a first electrical load (which may comprise one or more loads) across a first output terminal and the neutral terminal of a single-phase power converter, and connecting a second electrical load (which may comprise one or more loads) across a second output terminal and the neutral terminal of the single-phase power converter. As previously discussed, the loads may not be balanced such that the impedances of the loads may be different, including one of the first or second output terminals having no load connected.

Step 1502 includes controlling (e.g., with controller 80, 180, 280) the single-phase converter to convert a direct current (DC) input voltage across a first input terminal and a second input terminal to an alternating current (AC) output voltage across a first output terminal and a second output terminal. Controlling the single-phase converter to convert the DC input voltage to the AC output voltage may be as described above with respect to any of the single-phase converters disclosed herein.

Step 1503 comprises determining (e.g., by controller 80, 180, or 280) a phase balance between the first electrical load and the second electrical load. A phase balance may occur when the first electrical load and the second electrical load coupled have the same load consumption properties. In some cases, as described in reference to FIGS. 1, 2, 3, 4a-4b, 5a-5b, 9, 10, 11, and 14, a phase imbalance between the first electrical load and the second electrical load may occur. The phase imbalance may occur when one of the electrical loads is drawing more power than the other electrical load, or phases of current and/or voltage are different between the two electrical loads. If a phase balance between the first electrical load and the second electrical load is determined or detected, the method moves to step 1504. If a phase imbalance between the first electrical load and the second electrical load is determined or detected, the method moves to step 1505.

Step 1504 comprises controlling (e.g., with controller 80, 180, or 280) the power converter to conduct a common current with similar load properties (e.g., power, voltage. phase) to the first electrical load and the second electrical load, using a first control scheme. This may include the controller configuring the power converter circuit with a single current loop or a plurality of current loops through the switches of the power converter circuit. Based on a determined period of time/time interval/signal/an event/a measurement, the method moves back to step 1503. In some aspects, the first control scheme may comprise controlling circuits or switches that are temporarily turned off (e.g. to reduce switching losses) as previously described above with respect to FIGS. 4a, 4b, 5a, 5b, 10, 11 and 14. For example, the following circuits circuit or switches (or pair of switches) may be turned off during part of step 1504: the sixth circuit of FIGS. 4a-4b comprising switches Sb12 and Sb13, the sixth circuit of FIG. 5a comprising MOSFETs M7-M8 and M9-M10, the sixth circuit of FIG. 5b comprising IGBTs Sc7-Sc8 and Sc9-Sc10, the sixth circuit of FIG. 10 comprising switch Sb23, the sixth circuit of FIG. 11 comprising MOSFETs M7-M8 and the sixth circuit of FIG. 14 comprising MOSFETs M7-M8.

Step 1505 comprises controlling (e.g., with controller 80, 180, or 280) the power converter to conduct a first current to the first electrical load and a second current to the second electrical load, using a second control scheme, wherein the first current is larger than the second current. The second control scheme comprises conducting a difference between the first current and the second current through a switched path in the single-phase converter to the neutral terminal. In some examples, the first current is larger than the second current. In another example, the second current is larger than the first current. This may include the controller configuring the power converter circuit with at least two different current loops, a first current loop across the first electrical load (e.g., from terminal (C) to terminal (N)) to conduct a first current from a first capacitor coupled across the first input terminal and the neutral terminal, and a second current loop across the second electrical load (e.g., from terminal (D) to terminal (N)) to conduct a second current from the second capacitor across the second input terminal and the neutral terminal.

In step 1505, certain circuits and switches may be operated as described above with respect to the converters illustrated in FIGS. 4a, 4b, 5a, 5b, 10, 11 and 14 according the second control scheme to provide least one of: a first current loop across the first electrical load (e.g., from terminal (C) to terminal (N)) to conduct a first current from a first capacitor coupled across the first input terminal and the neutral terminal, and a second current loop across the second electrical load (e.g., from terminal (D) to terminal (N)) to conduct a second current from the second capacitor across the second input terminal and the neutral terminal. These circuits and switches (or pair of switches) include: the sixth circuit of FIGS. 4a-4b comprising switches Sb12 and Sb13, the sixth circuit of FIG. 5a comprising MOSFETs M7-M8 and M9-M10, the sixth circuit of FIG. 5b comprising IGBTs Sc7-Sc8 and Sc9-Sc10, the sixth circuit of FIG. 10 comprising switch Sb23, the sixth circuit of FIG. 11 comprising MOSFETs M7-M8 and the sixth circuit of FIG. 14 comprising MOSFETs M7-M8. According to some aspects, the second control scheme of step 1505 may comprise method 1300 of FIG. 13 illustrates an example for controlling the switches of the single-phase converter.

Examples of algorithms, functions, processes and control of power converters, circuits, and systems described herein (e.g., power converter circuits 10, 20, 30, 40, 45, 50, 55, 100, 110, and 140) may be embodied in hardware control logic and memory (e.g., application specific integrated circuits, field programmable gate arrays) and/or computer-executable instructions executed by one or more computers or other devices (e.g., controllers 80, 180, 280). The computers and other devices that execute the instructions may include microprocessors, microcontrollers, digital signal processors, embedded controllers, etc. Computer-executable instructions may include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. For example, a power converter, system or device may comprise one or more processors and memory storing computer executable instructions, that when executed by the one or more processors, performs the steps of methods 1200, 1300, 1500, or any other control function described herein.

What is claimed is:
1. An apparatus comprising:
   a direct-current (DC) input comprising a first input terminal and a second input terminal;
   an alternating-current (AC) split-phase output comprising a first output terminal, a second output terminal, and a first intermediate terminal;

a single-phase converter circuit comprising:
  a plurality of switches, and
  a controller configured to modulate the plurality of switches to convert DC power received at a DC voltage across the first and the second input terminals to AC power at an AC voltage across the first and the second output terminals;
  wherein the plurality of switches includes: a first switch coupled between the first input terminal and a second intermediate terminal, a second switch coupled between the second input terminal and the second intermediate terminal, a third switch coupled between the first input terminal and a third intermediate terminal, and a fourth switch coupled between the second input terminal and the third intermediate terminal, a fifth switch coupled between the second intermediate terminal and the third intermediate terminal, a sixth switch coupled between the first intermediate terminal and the second intermediate terminal; and a seventh switch coupled between the first intermediate terminal and the third intermediate terminal;
  a plurality of inductors including: a first inductor coupled between the second intermediate terminal and the first output terminal, and a second inductor coupled between the third intermediate terminal and the second output terminal; and
  a plurality of capacitors including: a first capacitor coupled between the first input terminal and the first intermediate terminal, a second capacitor coupled between the second input terminal and the first intermediate terminal, a third capacitor coupled between the first output terminal and the first intermediate terminal, and a fourth capacitor coupled between the second output terminal and the first intermediate terminal.

2. The apparatus of claim 1, wherein the fifth, the sixth, and the seventh switches each comprise a first transistor and a second transistor, wherein the first and the second transistors are coupled in series, wherein the first and the second transistors each comprise a diode, and wherein the diode of the first transistor and the diode of the second transistor are coupled in opposite directions.

3. The apparatus of claim 1, wherein the AC voltage is at a first frequency, and wherein to modulate the plurality of switches to convert the DC power to the AC power, the controller is configured to pulse width modulate one or more of the plurality of switches at a second frequency and control, based on the first frequency, a duty cycle of the pulse width modulation.

4. The apparatus of claim 1, wherein the controller is further configured to:
  determine an imbalance between a first AC phase output and a second AC phase output of the AC split-phase output, wherein the first AC phase output is across the first output terminal and the first intermediate terminal, and the second AC phase output is across the second output terminal and the first intermediate terminal; and
  control the plurality of switches, based on the determined imbalance, to conduct a differential current through a switched path in the single-phase converter circuit to or from the first intermediate terminal.

5. The apparatus of claim 4, wherein the differential current comprises a difference between a first current to a first electrical load connected across the first output terminal and the first intermediate terminal, and a second current through a second electrical load connected across the second output terminal and the first intermediate terminal.

6. The apparatus of claim 4, wherein the controller, via the plurality of switches, is configured to control the differential current to compensate for the determined imbalance.

7. The apparatus of claim 4, wherein the controller is configured to, based on the determined imbalance, control the switched path to conduct the differential current between the first intermediate terminal and the one of the first output terminal and the second output terminal.

8. The apparatus of claim 4, wherein the controller is configured to control the plurality of switches to connect the switched path between the first and the second intermediate terminals, between the first and the third intermediate terminals, and between the second and the third intermediate terminals.

9. The apparatus of claim 4, wherein the controller is configured to:
  detect a phase balance between the first AC phase output and the second AC phase output; and
  disable, based on the detected phase balance, one or more of the plurality of switches in the switched path.

10. The apparatus of claim 4, wherein said control comprises, based on a reference signal comprising a sine wave, during a positive half of the reference signal, controlling the sixth switch and the seventh switch in a complementary manner with respect to the first switch and the fourth switch and in correspondence with the fifth switch and, during a negative half of the reference signal, controlling the sixth switch and the seventh switch in a complementary manner with respect to the second switch and the third switch and in correspondence with the fifth switch.

11. The apparatus of claim 10, wherein the controller is configured, based on detecting a low load power consumption by a first load connected across the first AC phase output and a second load connected across the second AC phase output to vary modulation of the fifth switch, the sixth switch and the seventh switch.

12. The apparatus of claim 10, wherein the controller is configured, based on detecting a balanced load power consumption by a first load connected across the first AC phase output and a second load connected across the second AC phase output, during the negative half of the reference signal, to divide current flowing through the first and second inductors into two different current paths.

13. The apparatus of claim 12, wherein the two different current paths comprise:
  a first current path comprising the fifth switch; and
  a second current path comprising the sixth switch and the seventh switch.

14. The apparatus of claim 1, further comprising a first storage circuit coupled across the first input terminal and the first intermediate terminal and a second storage circuit coupled across the second input terminal and the first intermediate terminal.

15. An apparatus comprising:
  a direct-current (DC) input comprising a first input terminal and a second input terminal;
  an alternating-current (AC) split-phase output comprising a first output terminal, a second output terminal, and a first intermediate terminal;
  a single-phase converter circuit comprising a first plurality of switches, a second plurality of switches, first and second inductors, and a controller,
  wherein the first inductor is coupled between the first output terminal and a second intermediate terminal, and the second inductor is coupled between the second output terminal and a third intermediate terminal, wherein the first plurality of switches comprises a first switch coupled between the first input terminal and the second intermediate terminal, a second switch coupled between the second input terminal and the second intermediate terminal, a third switch coupled between the first input terminal and the third intermediate terminal, and a fourth switch coupled between the second input terminal and the third intermediate terminal;

wherein the second plurality of switches comprises a fifth switch coupled between the second intermediate terminal and the third intermediate terminal;

a sixth switch coupled between the first intermediate terminal and the second intermediate terminal; and a seventh switch coupled between the first intermediate terminal and the third intermediate terminal; and wherein the controller is configured to:
  pulse width modulate the first plurality of switches to convert DC power received at a DC voltage across the first and the second input terminals to AC power at an AC voltage across the first and second output terminals;
  detect an imbalance between a first AC phase output and a second AC phase output of the AC split-phase output, wherein the first AC phase output is across the first output terminal and the first intermediate terminal, and the second AC phase output is across the second output terminal and the first intermediate terminal; and
  control the second plurality of switches, based on the detected imbalance, to conduct a differential current through a switched path between the first intermediate terminal and the second intermediate terminal, and between the first intermediate terminal and the third intermediate terminal.

16. A method comprising:
converting, with a single-phase converter circuit, direct current (DC) power received at a DC voltage across first and second input terminals to alternating current (AC) power at an AC voltage across first and second output terminals of a split-phase output, wherein the split-phase output comprises a first electrical load connected across the first output terminal and a first intermediate terminal, and a second electrical load connected across the second output terminal and the first intermediate terminal;
detecting a phase imbalance between first and the second electrical loads; and
controlling, based on the detected phase imbalance, a differential current through a switched path in the single-phase converter circuit to or from the first intermediate terminal, wherein differential current comprises a difference between a first current through the first electrical load and a second current through the second electrical load;

wherein the single-phase converter circuit comprises;
  a plurality of switches including: a first switch coupled between the first input terminal and a second intermediate terminal, a second switch coupled between the second input terminal and the second intermediate terminal, a third switch coupled between the first input terminal and a third intermediate terminal, and a fourth switch coupled between the second input terminal and the third intermediate terminal, a fifth switch coupled between the second intermediate terminal and the third intermediate terminal, a sixth switch coupled between the first intermediate terminal and the second intermediate terminal; and a seventh switch coupled between the first intermediate terminal and the third intermediate terminal;
  a plurality of inductors including: a first inductor coupled between the second intermediate terminal and the first output terminal, and a second inductor coupled between the third intermediate terminal and the second output terminal; and
  a plurality of capacitors including: a first capacitor coupled between the first input terminal and the first intermediate terminal, a second capacitor coupled between the second input terminal and the first intermediate terminal, a third capacitor coupled between the first output terminal and the first intermediate terminal, and a fourth capacitor coupled between the second output terminal and the first intermediate terminal.

17. The method of claim 16, wherein the single-phase converter circuit comprises a transformerless topology.

18. The method of claim 16, further comprising controlling, based on the detected phase imbalance, the differential current through a switched path between the first intermediate terminal and the first and the second input terminals via the first and second capacitors, respectively.

19. The method of claim 16, further comprising:
controlling, based on the detected phase imbalance, the switched path to conduct the differential current between the first intermediate terminal and one of the first output terminal and the second output terminal.

20. The method of claim 16, further comprising:
detecting a phase balance between first and the second electrical loads; and
disabling, based on the detected phase balance, the switched path.

* * * * *